US010876853B2

(12) United States Patent
Seko et al.

(10) Patent No.: US 10,876,853 B2
(45) Date of Patent: Dec. 29, 2020

(54) INFORMATION PRESENTATION DEVICE, INFORMATION PRESENTATION METHOD, AND STORAGE MEDIUM

(71) Applicant: HONDA MOTOR CO., LTD., Tokyo (JP)

(72) Inventors: Shigeyuki Seko, Raymond, OH (US); Shinichi Akama, Raymond, OH (US); Shuhei Kinoshita, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 214 days.

(21) Appl. No.: 16/028,725

(22) Filed: Jul. 6, 2018

(65) Prior Publication Data

US 2020/0011695 A1 Jan. 9, 2020

(51) Int. Cl.
*G01C 21/36* (2006.01)
*G06T 19/20* (2011.01)

(52) U.S. Cl.
CPC ....... *G01C 21/3638* (2013.01); *G01C 21/365* (2013.01); *G01C 21/3644* (2013.01); *G06T 19/20* (2013.01)

(58) Field of Classification Search
CPC ............ G01C 21/3638; G01C 21/3644; G01C 21/365; G06T 19/20
See application file for complete search history.

(56) References Cited

U.S. PATENT DOCUMENTS

| 8,521,411 B2 | 8/2013 | Grabowski et al. | |
| 2007/0233370 A1* | 10/2007 | Asada | G01C 21/3602 |
| | | | 701/431 |
| 2010/0253593 A1* | 10/2010 | Seder | G08G 1/161 |
| | | | 345/7 |
| 2012/0174004 A1* | 7/2012 | Seder | G02B 27/01 |
| | | | 715/764 |
| 2012/0224060 A1* | 9/2012 | Gurevich | B60R 1/00 |
| | | | 348/148 |
| 2013/0076615 A1* | 3/2013 | Iao | B60K 35/00 |
| | | | 345/156 |
| 2016/0009411 A1* | 1/2016 | Davalos | B64D 47/02 |
| | | | 345/156 |
| 2016/0349066 A1* | 12/2016 | Chung | G01C 21/3658 |
| 2018/0096668 A1* | 4/2018 | Surnilla | B60Q 3/80 |

FOREIGN PATENT DOCUMENTS

JP 2008-151754 A 7/2008

* cited by examiner

*Primary Examiner* — Aaron L Troost
(74) *Attorney, Agent, or Firm* — Carrier Blackman & Assoicates, P.C.; Joseph P. Carrier; Jeffrey T. Gedeon

(57) ABSTRACT

An information presentation device, an information presentation method, and a program capable of intuitively ascertaining a direction of a target position are provided. An information presentation device includes a first position acquirer 121 configured to acquire a current position of a subject device, an image generator 40 configured to cause an image that looks superimposed on scenery of a real space to appear, a second position acquirer 122 configured to acquire a target position on the real space where the image appears, a direction deriver 124 configured to derive a direction from the first position to the target position on the basis of the first position and the target position, and an output controller 128 configured to control the image generator such that the image is caused to appear based on the direction acquired by the direction deriver.

13 Claims, 25 Drawing Sheets

INFORMATION PRESENTATION DEVICE, INFORMATION PRESENTATION METHOD, AND STORAGE MEDIUM

BACKGROUND OF THE INVENTION

Field of the Invention

The present invention relates to an information presentation device, an information presentation method, and a storage medium.

Description of Related Art

Conventionally, a technique for displaying a travel route on a map has been disclosed (for example, U.S. Pat. No. 8,521,411). Conventionally, a technique for superimposing and displaying a virtual line indicating a travel route in a real space has been disclosed (for example, Japanese Unexamined Patent Application, First Publication No. 2008-151754).

SUMMARY OF THE INVENTION

In a display of the travel route on a map or a display of the virtual line indicating a travel route in the prior art, it is difficult to intuitively ascertain a direction to a target position.

The present invention is made in consideration of such a circumstance, and an object of the present invention is to provide an information presentation device, an information presentation method, and a program that support intuitively ascertaining a direction to a target position.

An information presentation device, an information presentation method, and a storage medium according to the present invention adopt the following constitution.

(1): An information presentation device according to an aspect of the present invention includes a first position acquirer configured to acquire a current position of a subject device, an image generator configured to cause an image that looks superimposed on scenery of a real space to appear, a second position acquirer configured to acquire a target position on the real space where the image appears, a direction deriver configured to derive a direction from the first position to the target position on the basis of the first position and the target position, and a controller configured to control the image generator such that the image is caused to appear based on the direction acquired by the direction deriver.

(2): In the aspect of the above-described (1), the information presentation device further includes a distance deriver configured to derive a distance between the target position and the first position, and the output controller enlarges the image as the distance becomes smaller.

(3): In the aspect of the above-described (2), the output controller fixes a size of the image to a predetermined size in a case where the distance is equal to or longer than a predetermined distance.

(4): In the aspects of the above-described (1) to (3), the image generator causes an image extending in a vertical direction from the ground to appear.

(5): In the aspects of the above-described (1) to (4), the output controller shields scenery behind the target position from the first position and causes an image that does not shield the scenery in front of the target position from the first position to appear.

(6): In the aspects of the above-described (1) to (5), the information presentation device further includes a real space recognizer configured to recognize a situation of the real space, and the output controller determines an aspect of the image according to the situation of the real space recognized by the real space recognizer.

(7): In the aspect of the above-described (6), the real space recognizer recognizes a movement of a wind in the real space, and the output controller moves the image according to the movement of the wind.

(8): In the aspects of the above-described (1) to (7), the information presentation device further includes an operation recognizer configured to recognize a content of an operation of a user, and the output controller moves or deletes the image on the basis of the content of the operation.

(9): In the aspects of the above-described (1) to (8), the information presentation device further includes a line of sight detector configured to detect a line of sight of a user, and a notificator configured to output information indicating the direction to the target position to the user in a case where a detection result of the line of sight detector indicates that the user is not viewing the image.

(10): In the aspects of the above-described (1) to (9), the target position is a destination of a user.

(11): In the aspects of the above-described (1) to (10), the target position is a position of a target person designated by a user.

(12): In the aspect of the above-described (11), the output controller determines an aspect of the image according to a state of the target person.

(13): In the aspects of the above-described (1) to (12), the target position is a position of a target vehicle designated by a user.

(14): In the aspect of the above-described (13), the information presentation device includes operation recognizer configured to recognize a content of an operation for the target vehicle by the user and a communication device configured to communicate with another device, and the communication device transmits information indicating the content of the operation to the other device.

(15): In the aspect of the above-described (14), the output controller determines an aspect of the image on the basis of a recognition result of the operation recognizer.

(16): An information presentation method according to an aspect of the present invention causes a computer, acquiring a first position, configuring to cause an image superimposed on scenery of a real space to appear, acquiring a target position on the real space, deriving a direction from the first position acquirer to the target position, and controlling the image appear at the position based on the direction.

(17): A computer readable non-transitory storage medium according to an aspect of the present invention stores a program that causes a computer by a predetermined user to acquire a first position, configure to cause an image superimposed on scenery of a real space to appear, acquire a target position on the real space, derive a direction from the first position acquirer to the target position; and control the image appear at the position based on the direction.

According to (1) to (17), it is possible to intuitively ascertain the direction to the target position.

According to (2), it is possible to intuitively ascertain the distance to the target position.

According to (3), it is possible to prevent difficulty in ascertaining the target position.

According to (5), it is possible to represent a perspective of the target position.

According to (6), it is possible to perform more realistic guidance of a target position.

According to (8), it is possible to easily change the target position.

According to (9), it is possible to ascertain the target position by a method other than a method of viewing the target position.

DETAILED DESCRIPTION OF THE INVENTION

Hereinafter, embodiments of an information presentation device, an information presentation method, and a storage medium of the present invention will be described with reference to the drawings.

First Embodiment

Figure 1:
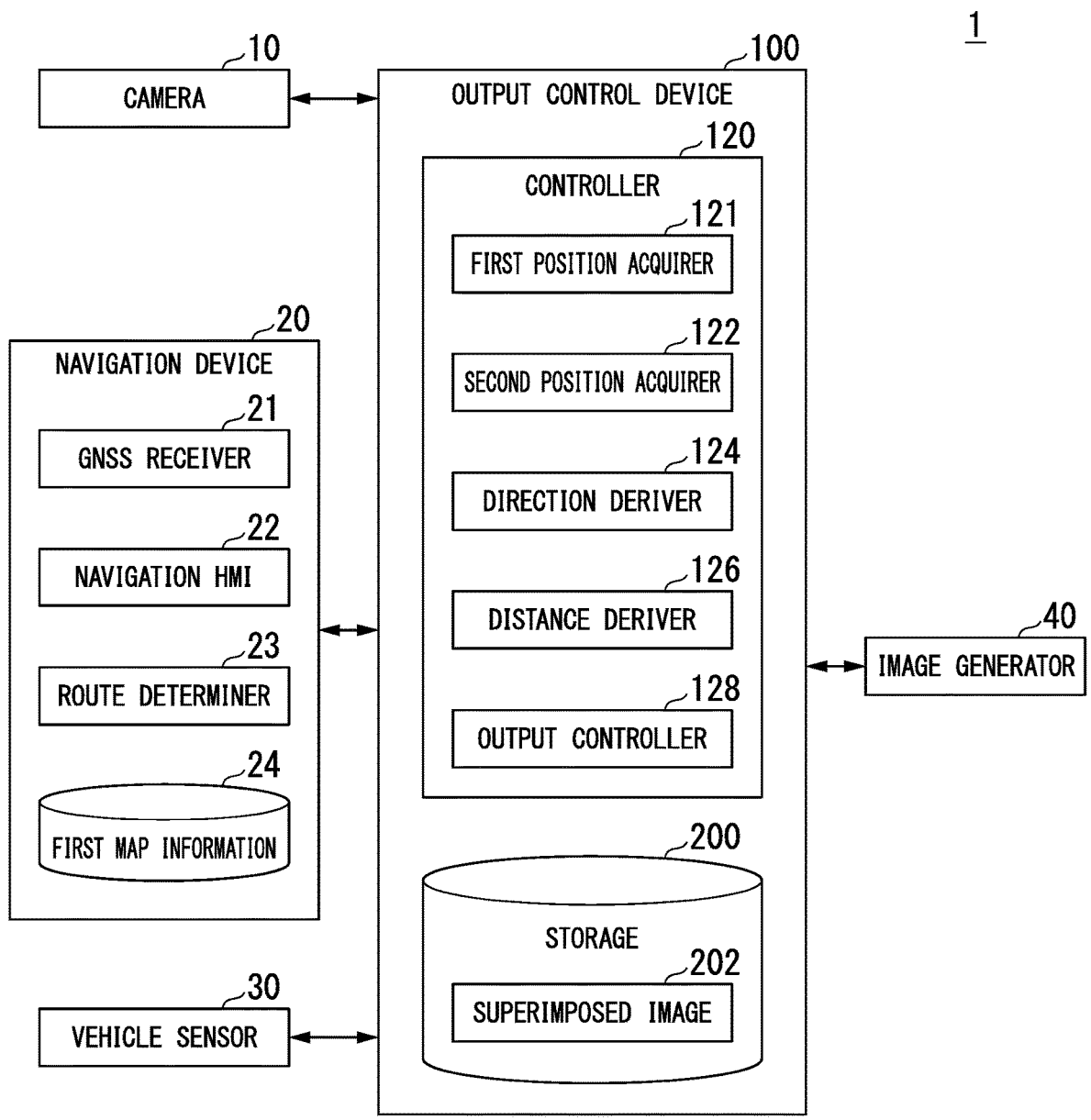
FIG. 1 is a diagram illustrating an example of a constitution of an output control system 1 of a first embodiment.

FIG. 1 is a diagram illustrating an example of a constitution of an output control system 1 of the first embodiment. The output control system 1 includes a camera 10, a navigation device 20, a vehicle sensor 30, an image generator 40, and an information presentation device 100. Hereinafter, a case where the output control system 1 is mounted on a vehicle (hereinafter, an own vehicle M) will be described. For example, the own vehicle M is a vehicle such as a two-wheeled vehicle, a three-wheeled vehicle, or a four wheeled vehicle.

For example, the camera 10 is a digital camera using a solid state imaging element such as a charge coupled device (CCD) or a complementary metal oxide semiconductor (CMOS). The camera 10 is attached to an arbitrary position of the own vehicle M. For example, in a case where the camera 10 images a front, the camera 10 is attached to an upper portion of the front windshield, a rear surface of a room mirror, or the like. For example, the camera 10 periodically repeatedly images the surroundings of the own vehicle M. The camera 10 may be a stereo camera.

For example, the navigation device 20 includes a global navigation satellite system (GNSS) receiver 21, a navigation human machine interface (HMI) 22, and a route determiner 23. The navigation device 20 stores first map information 24 in a storage device such as a hard disk drive (HDD) or a flash memory.

The GNSS receiver 21 specifies a first position (current position) of the own vehicle M on the basis of a signal received from a GNSS satellite. The first position of the own vehicle M may be specified or supplemented by an inertial navigation system (INS) using an output of a vehicle sensor 30. The GNSS receiver 21 may be configured to specify a current position of an occupant of the own vehicle M instead of (or in addition to) a constitution for specifying the first position of the own vehicle M, on the basis of the signal received from the GNSS satellite. For example, the GNSS receiver 21 acquires the position specified on the basis of the signal received from the GNSS satellite as the position of the occupant. The GNSS receiver 21 may specify the first position of the occupant by correcting the position specified by the signal received from the GNSS satellite, by the position of the occupant detected by a seat sensor of a seat or an in-vehicle camera.

The navigation HMI 22 includes a display device, a speaker, a touch panel, a key, and the like. A destination (hereinafter, a destination DP) is input by the occupant of the own vehicle M to the navigation HMI 22. In a case where the own vehicle M includes another HMI, the navigation HMI 22 may share a part or all of functions with the other HMI device. The destination DP is a first example of the "target position".

Information indicating the destination DP is output to the information presentation device 100. In the following description, the occupant of the own vehicle M will simply be described as an occupant.

For example, the route determiner 23 determines a route from the position of the own vehicle M specified by the GNSS receiver 21 (or an input arbitrary position) to the destination DP input to the navigation HMI 22 with reference to first map information 24. For example, the first map information 24 is information in which a road shape is expressed by a link indicating a road and a node connected by the link. The first map information 24 may include a curvature of the road, point of interest (POI) information, or the like.

The navigation device 20 may perform a route guidance using the navigation HMI 22 on the basis of the route on the map. For example, the navigation device 20 may be realized by a function of a terminal device such as a smartphone or a tablet terminal possessed by the occupant. The navigation device 20 may transmit the first position and the destination to a navigation server through a communication device (not shown) and acquire a route equivalent to the route on the map from the navigation server.

The vehicle sensor 30 includes a vehicle speed sensor that detects a speed of the own vehicle M, an acceleration sensor that detects an acceleration, a yaw rate sensor that detects an angular speed around a vertical axis, an azimuth sensor that detects a direction of the own vehicle M, and the like. For example, the vehicle sensor 30 detects geomagnetism and detects an azimuth of a progression direction of the own vehicle M. Specifically, the vehicle sensor 30 detects an azimuth of a reference line connecting a reference point and a front of the own vehicle M, that is a reference line passing through a reference point (for example, a center of gravity) of the own vehicle M. Information indicating the azimuth is output to the information presentation device 100.

The image generator 40 causes an image (hereinafter an image VI) which looks superimposed on scenery of the real space to appear. The image generator 40 is realized by, for example, a head-up display (HUD) displayed on the front window or in the vicinity of the front window or a transparent liquid crystal display provided on the front window or in the vicinity of the front window. The image generator 40 causes the image VI to appear on the basis of the control of the information presentation device 100. The image generator 40 may be realized by a head-up display or a transparent liquid crystal display provided in a side window or a rear window (or in the vicinity thereof) and may be realized by a head-up display or a transparent liquid crystal display used as a navigation or a meter, without limitation to the front window. In a case where the own vehicle M is a two-wheeled vehicle or a three-wheeled vehicle, an HUD or a transparent liquid crystal display may be provided in a cowl instead of a front window or a transparent liquid crystal display may be provided in a shield of a helmet.

For example, the information presentation device 100 includes a controller 120 and a storage 200. For example, the controller 120 includes a first position acquirer 121, a second position acquirer 122, a direction deriver 124, a distance deriver 126, and an output controller 128. For example, each unit of the controller 120 is realized by a hardware processor such as a central processing unit (CPU) executing a program (software) stored in the storage 200. A part or all of such elements may be realized by hardware (a circuit unit including a circuitry) such as a large scale integration (LSI), an application specific integrated circuit (ASIC), a field-programmable gate array (FPGA), or a graphics processing unit (GPU), or may be realized by cooperation between software and hardware.

For example, the storage 200 is realized by a non-transitory storage medium such as an HDD, a flash memory, an electrically erasable programmable read only memory (EEPROM), or a read only memory (ROM). For example, the storage 200 stores a program that is read and executed by a hardware processor. For example, in the storage 200, a superimposed image 202 that is an image appearing as the image VI by the image generator 40 is stored. For example, the superimposed image 202 is image data of an image that is viewed by the occupant as an object extending in a vertical direction or element data for generating an image. In the following description, a case where the superimposed image 202 is data related to an image of a signal fire and the image VI appearing by the image generator 40 is the signal fire image will be described.

The first position acquirer 121 acquires the information indicating the first position of the own vehicle M from the GNSS receiver 21. The target position acquirer 122 acquires the destination DP from the navigation device 20.

The direction deriver 124 derives a direction of the destination DP with respect to the own vehicle M, on the basis of the first position acquired by the first position acquirer 121, the destination DP acquired by the target position acquirer 122, and the azimuth of the reference line of the own vehicle M detected by the vehicle sensor 30.

Figure 2:
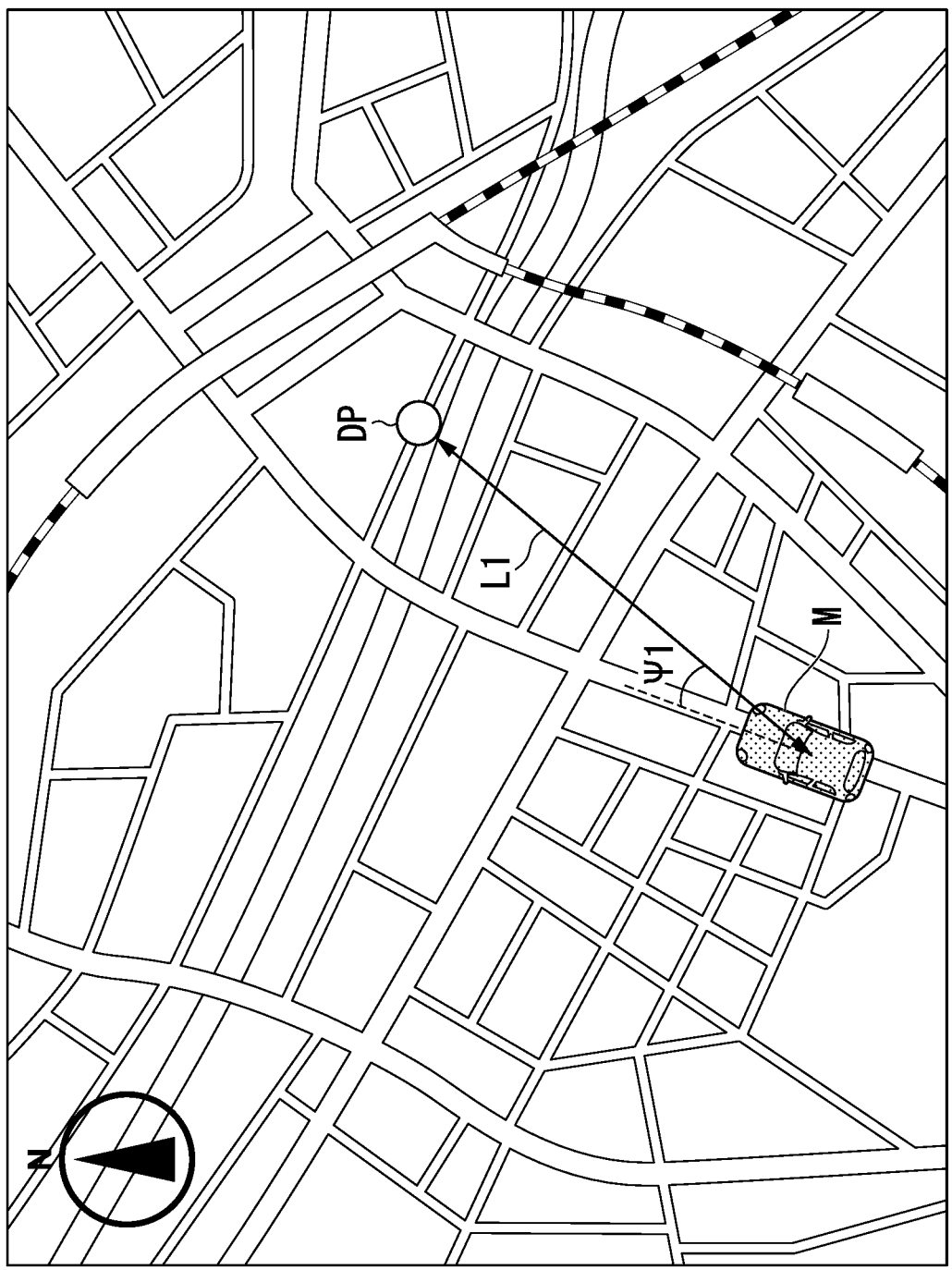
FIG. 2 is a diagram schematically illustrating an example of processing of a direction deriver 124 of the first embodiment.

FIG. 2 is a diagram schematically illustrating an example of processing of the direction deriver 124 of the first embodiment. The direction deriver 124 derives an angle formed by a line segment connecting the first position and the destination DP and the reference line of the own vehicle M as an azimuth angle of the destination DP (hereinafter, referred to as a destination azimuth angle $\psi 1$) with respect to the own vehicle M, on the basis of the first position, the destination DP, and the azimuth of the reference line of the own vehicle M. For example, the azimuth angle is an angle about an axis passing through a reference point (for example, the center of gravity) of the own vehicle M in the vertical direction and an angle having a positive value in a clockwise direction using a direction along the reference line (for example, a vehicle center axis) of the own vehicle M as zero degrees.

Returning to FIG. 1, the distance deriver 126 derives a distance from the first position to the destination DP (hereinafter, referred to as a destination distance L1), on the basis of the first position acquired by the first position acquirer 121 and the destination DP acquired by the target position acquirer 122.

The output controller 128 controls the image generator 40 so that the destination image VI1 appears by superimposing the destination image VI1 on the real space, on the basis of the destination azimuth angle $\psi 1$ derived by the direction deriver 124 and the destination distance L1 derived by the distance deriver 126. For example, the destination image VI1 is the image VI indicating the direction of the destination DP and the distance of the destination DP and is the image VI that is viewed by the occupant as the signal fire extending from the ground of the destination DP in the vertical direction. In the following description, causing the image VI to appear by controlling the image generator 40 by the controller 168 is also described as the output controller 128 causing the image VI to appear.

[Regarding the Destination Image VI1 Indicating the Destination DP]

Figure 3:
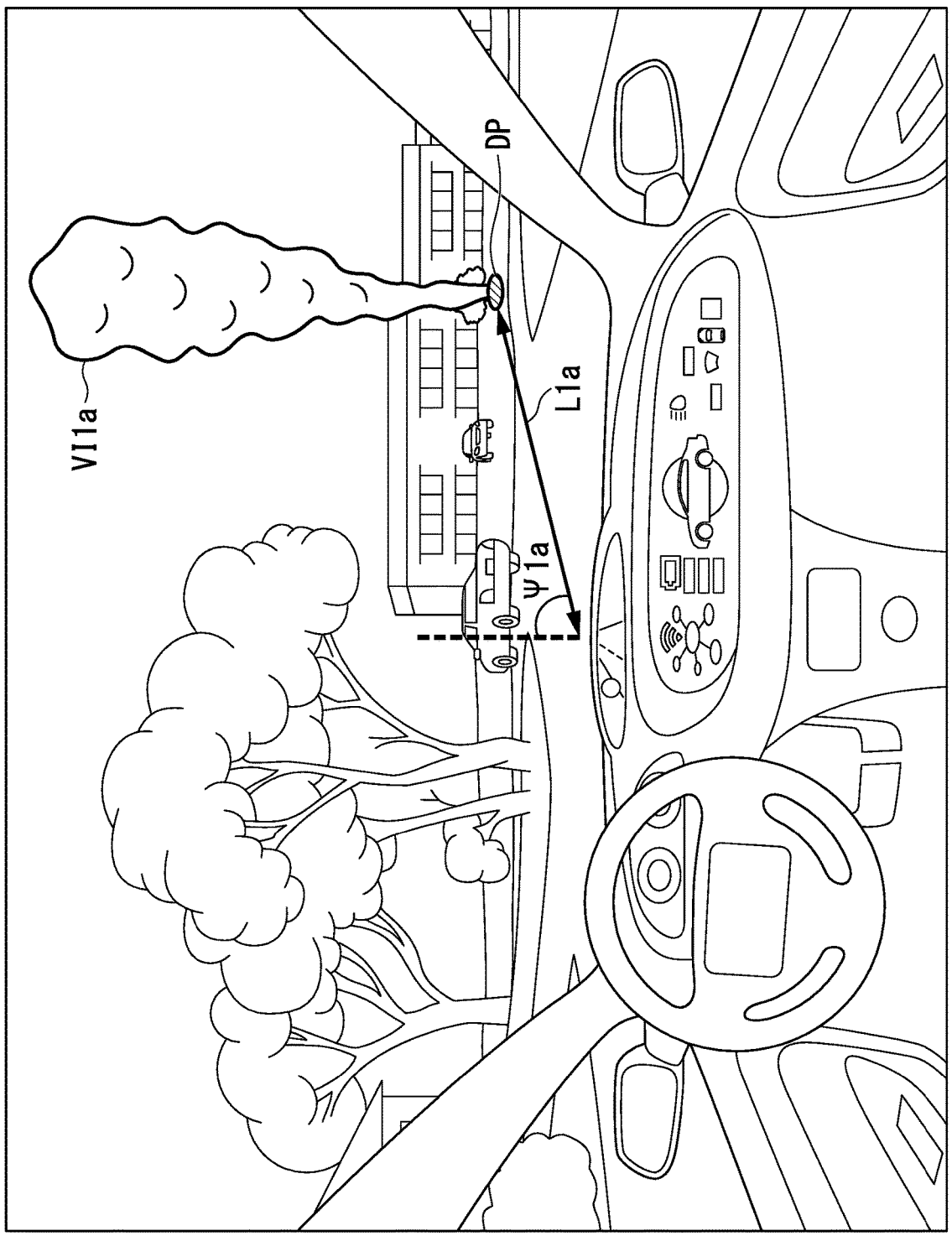
FIG. 3 is a diagram illustrating an example of a destination image VI1a appearing by an image generator 40.

FIG. 3 is a diagram illustrating an example of a destination image VI1a appearing by the image generator 40. A destination azimuth angle ψ1a shown in FIG. 3 corresponds to the destination azimuth angle ψ1 and a destination distance L1a corresponds to the destination distance L1.

For example, the output controller 128 causes the destination image VI1a to appear so that it is regarded as existing at the destination DP that is in the direction of the destination azimuth angle ψ1a and is separated from the first position by the destination distance L1a. Therefore, the occupant can intuitively ascertain the distance to the destination DP and the direction of the destination DP.

[Regarding the Destination Image VI1 Indicating the Destination DP: in a Case Where the Destination Distance L1 is Short]

Figure 4:
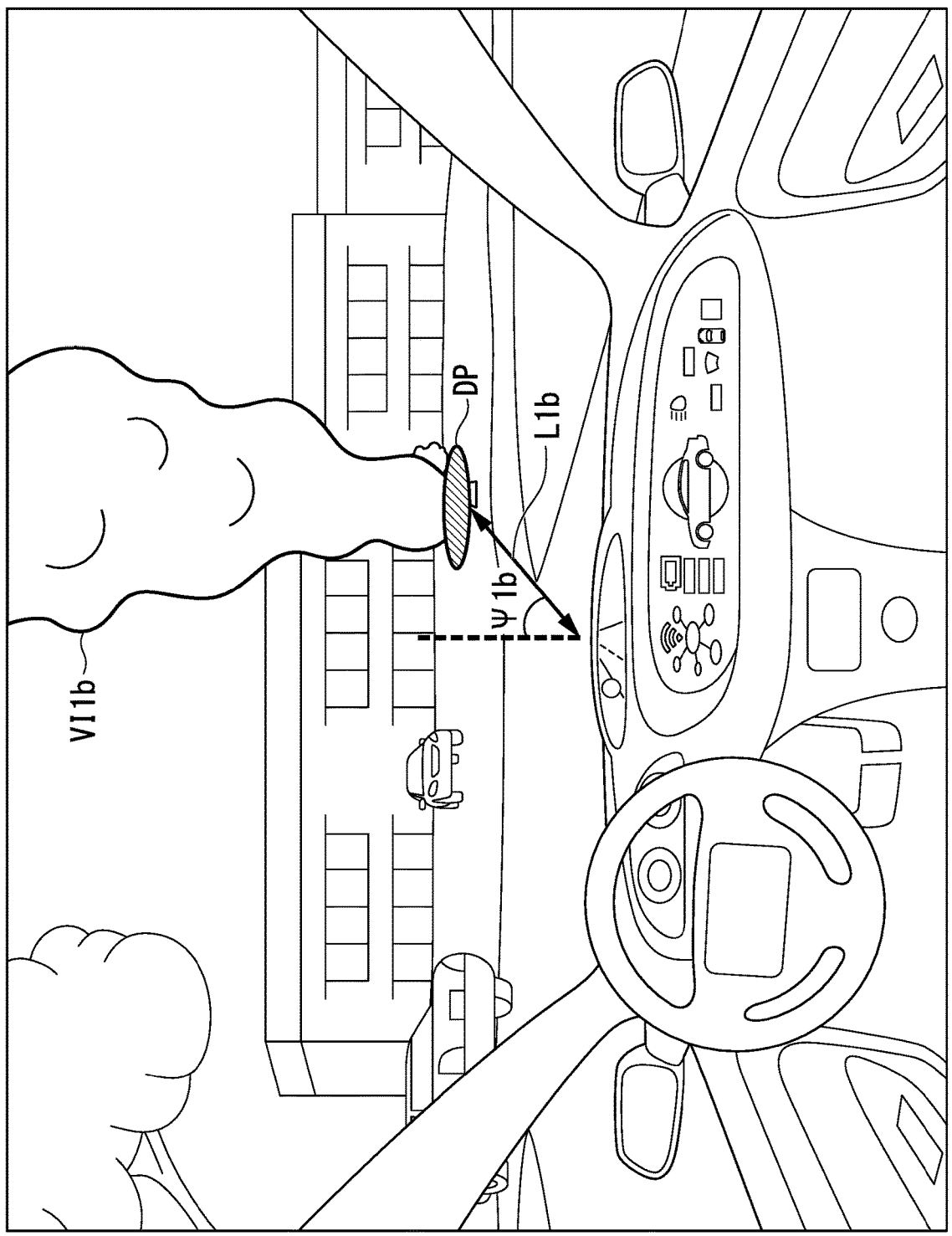
FIG. 4 illustrates an example of a destination image VI1 caused to appear by the image generator 40 in a case where a destination distance L1 is shorter than in FIG. 3.

FIG. 4 illustrates an example of the destination image VI1 caused to appear by the image generator 40 in a case where the destination distance L1 is shorter than in FIG. 3. A destination azimuth angle ψ1b shown in FIG. 4 corresponds to the destination azimuth angle ψ1 and a destination distance L1b corresponds to the destination distance L1. A destination image VI1b is the destination image VI1 appearing at the first position of the own vehicle M. The first position of an example shown in FIG. 3 and the first position of an example shown in FIG. 4 are different from each other, and in the destination distance L1a and the destination distance L1b, the destination distance L1b is a shorter distance.

The output controller 128 controls the image generator 40 such that the destination image VI1 is caused to appear by determining a size of the destination image VI1 according to the destination distance L1 and represents a viewed method of the destination image VI1 by the occupant. For example, in a case where the destination distance L1 is long, the output controller 128 causes the destination image VI1 to appear small, and in a case where the destination distance L1 is short, the output controller 128 causes the destination image VI1 to appear largely. Therefore, the destination image VI1b is shown with a size larger than that of the destination image VI1a. Specifically, the output controller 128 causes the destination image VI1b extensively showing the superimposed image 202 to appear in an extended manner. Therefore, the occupant can intuitively ascertain the destination distance L1 to the destination DP.

[Regarding the Destination Image VI1 Indicating the Destination DP: in a Case Where the Destination Distance L1 is Long]

Figure 5:
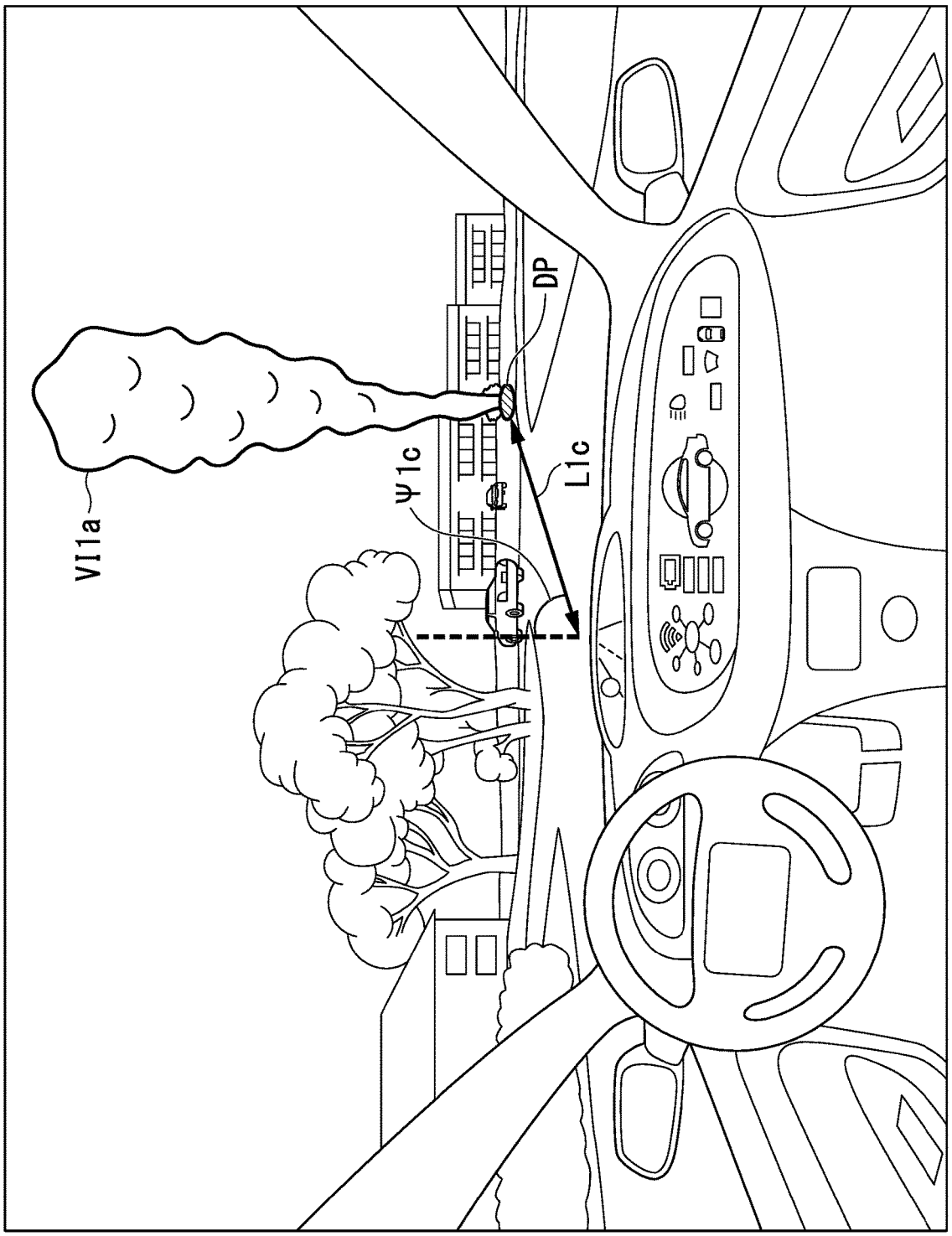
FIG. 5 illustrates an example of the destination image VI1 caused to appear by the image generator 40 in a case where the destination distance L1 is longer than in FIG. 3.

FIG. 5 illustrates an example of the destination image VI1 caused to appear by the image generator 40 in a case where the destination distance L1 is longer in FIG. 3. A destination azimuth angle ψ1c shown in FIG. 5 corresponds to the destination azimuth angle ψ1 and a destination distance L1c corresponds to the destination distance L1. The first position of the own vehicle M of an example shown in FIG. 3 and the first position of the own vehicle M of an example shown in FIG. 5 are different from each other, and in the destination distance L1a and the destination distance L1c, the destination distance L1c is a longer distance.

As described above, for example, in a case where the destination distance L1 is long, the output controller 128 causes the destination image VI1 to appear small to represent the viewed method of the destination image VI1 by the occupant, but in a case where a value of the destination distance L1 is large, the destination image VI1 appears too small and the occupant may not be able to view the destination image VI1 in some cases. Therefore, in a case where the destination distance L1 is equal to or longer than a predetermined distance, the output controller 128 fixes the size of the destination image VI1 to a predetermined size (for example, a size of the destination image VI1a). In other words, the output controller 128 causes the destination image VI1a to appear during a movement from a position equal to or longer than the destination distance L1a (for example, a position of the destination distance L1c) to a position equal to or less than the destination distance L1a, and the output controller 128 causes the destination image VI1 of a size according to the destination distance L1 to appear in a position less than the destination distance L1a. Therefore, the occupant can intuitively ascertain the destination image VI1 at a distance while preventing difficulty in ascertaining the destination distance L1 to the destination DP by the occupant.

[Regarding the Representation of the Destination Image VI1 According to a Situation of the Real Space: External Situation Such as Weather]

Figure 6:
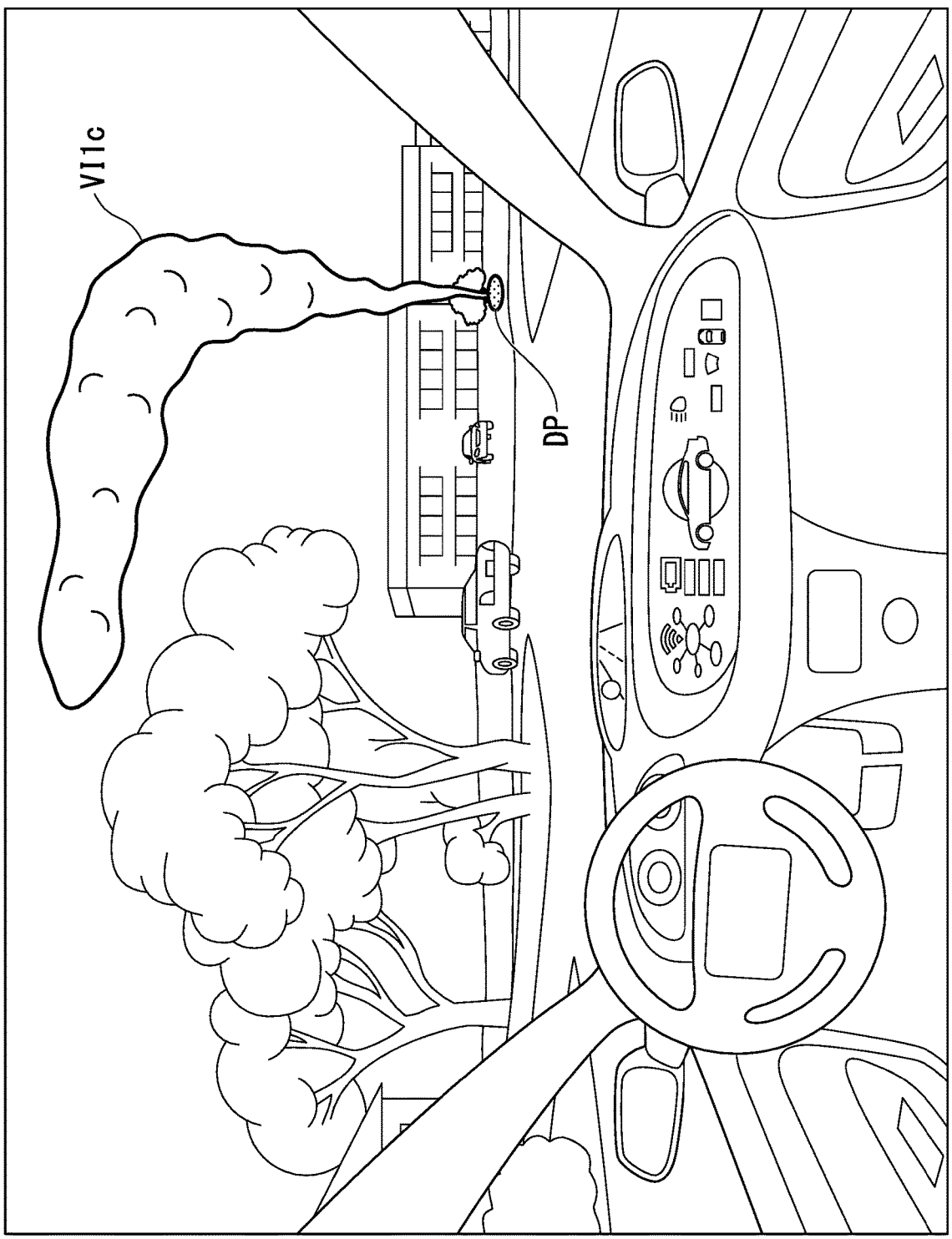
FIG. 6 is a diagram illustrating an example of the destination image VI1 according to an external situation of an own vehicle M.

FIG. 6 is a diagram illustrating an example of the destination image VI1 according to a external situation of the own vehicle M. For example, the output controller 128 represents the viewed method of the destination image VI1 by the occupant according to the external situation. For example, the external situation is the weather or the like of a surrounding environment of the own vehicle M. For example, the vehicle sensor 30 detects a wind direction in the surrounding environment of the own vehicle M, and the output controller 128 causes the destination image VI1 (a destination image VI1c shown in the drawing) that is viewed as the signal fire flows in a direction of the wind direction to appear, according to the wind direction detected by the vehicle sensor 30. Therefore, the output control system 1 can perform guidance of the destination DP while providing a more realistic image to the occupant.

The weather of the surrounding environment of the own vehicle M is not limited to the wind direction, and the output controller 128 may control the image generator 40 such that the destination image VI1 is caused to appear according to other weather. For example, in a case where fog is generated or it is raining, the output controller 128 may control the image generator 40 such that the destination image VI1 is caused to appear that is difficult to be viewed by the occupant.

[Regarding the Representation of the Destination Image VI1 According to a Situation of the Real Space: an Object Such as a Building]

Figure 7:
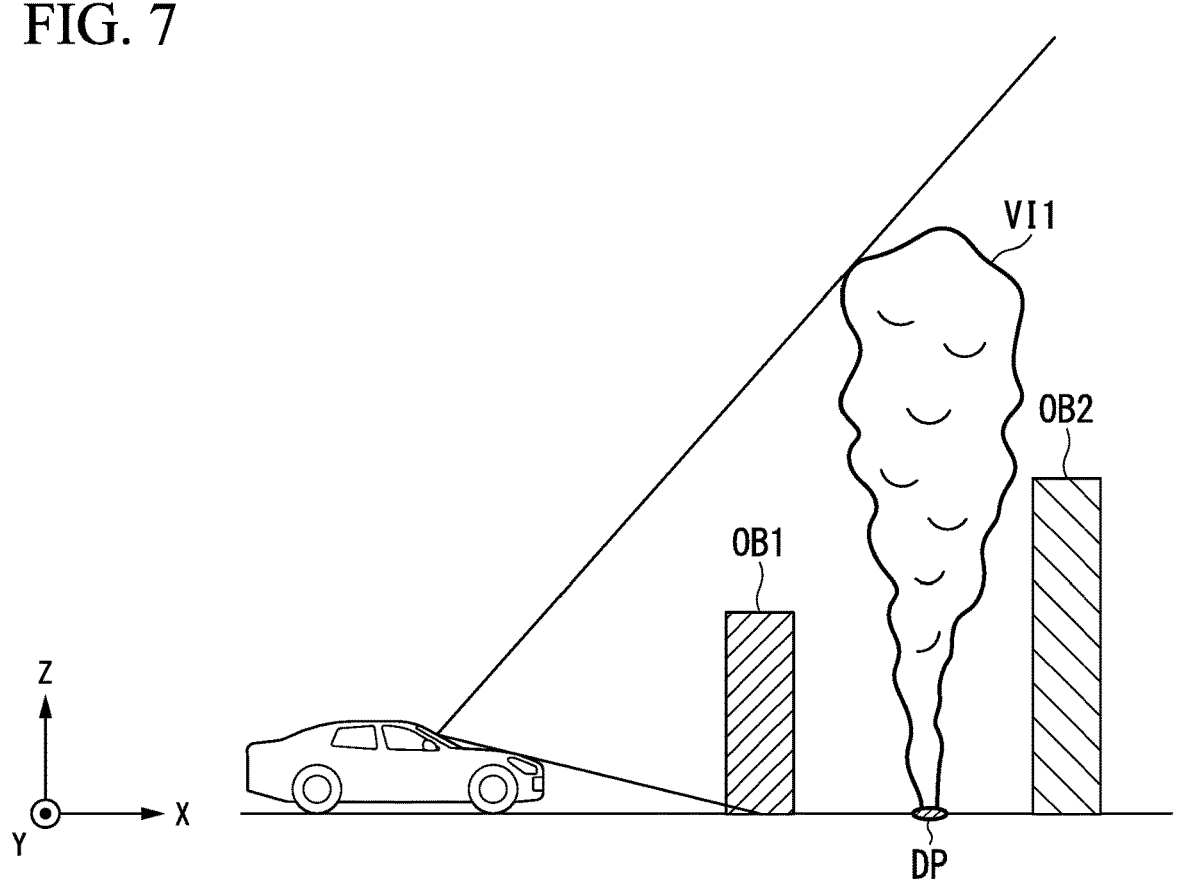
FIG. 7 is a side view illustrating an example of a relationship between a building in the vicinity of the own vehicle M and the destination image VI1.
Figure 8:
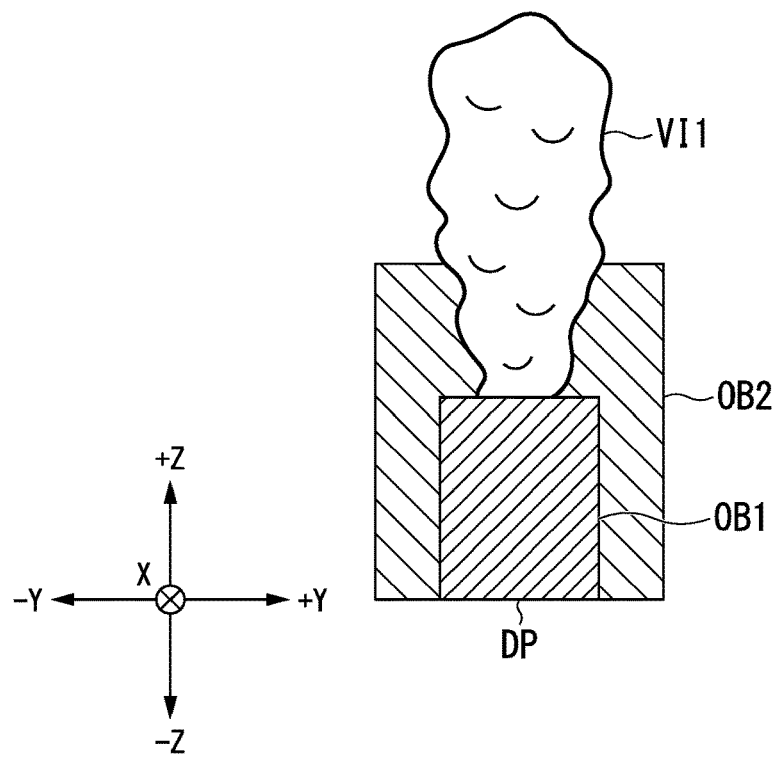
FIG. 8 is a front view illustrating an example of the relationship between the building in the vicinity of the own vehicle M and the destination image VI1.

FIG. 7 is a side view illustrating an example of a relationship between the building in the vicinity of the own vehicle M and the destination image VI1. FIG. 8 is a front view illustrating an example of the relationship between the building in the vicinity of the own vehicle M and the destination image VI1. An X direction shown in FIGS. 7 and 8 is a direction forward from the own vehicle M, a Y direction is a width direction of the own vehicle M, and a Z direction is a vertical direction of the own vehicle M.

In the above-described FIGS. 3 to 6, a case where the destination DP is shown in the image captured by the camera 10 has been described. Here, in a case where an object such as the building (an object OB1 shown in the drawing) is present between the own vehicle M and the destination DP, the destination DP may not be shown in the image in some cases. In this case, in a case where the output controller 128 causes the destination image VI1 to appear by the processing as described above, the destination image VI1 is superimposed on the object OB1 and appears, and thus there is a case where the occupant misunderstands the destination image VI1 as the destination DP is present in front of the object OB1.

Therefore, the output controller 128 causes the destination image VI1 to appear so as to shield scenery behind the destination DP as viewed from the occupant and so as not to shield scenery before the destination DP as viewed from the occupant. In this case, for example, the camera 10 is a stereo camera, and the output controller 128 acquires an outer shape, a height, and a depth of objects OB (objects OB1 to OB2 shown in the drawing) in the vicinity of the own vehicle M, on the basis of the image captured by the camera 10. The output controller 128 determines whether the captured image of the object OB1 is present before or behind the destination DP as viewed from the own vehicle M. In the shown example, the output controller 128 determines that the object OB1 is present before the destination DP and determines that the object OB2 is present behind the destination DP.

The output controller 128 causes the destination image VI to appear from a position higher than the height of the acquired object OB1 so as not to shield the object OB1. The output controller 128 causes the destination image VI to appear so as to shield the object OB2. Therefore, the occupant can more intuitively ascertain the destination distance L1 to the destination DP by the destination image VI1.

[Regarding Another Example of the Representation of the Destination Image VI1]

Figure 9:
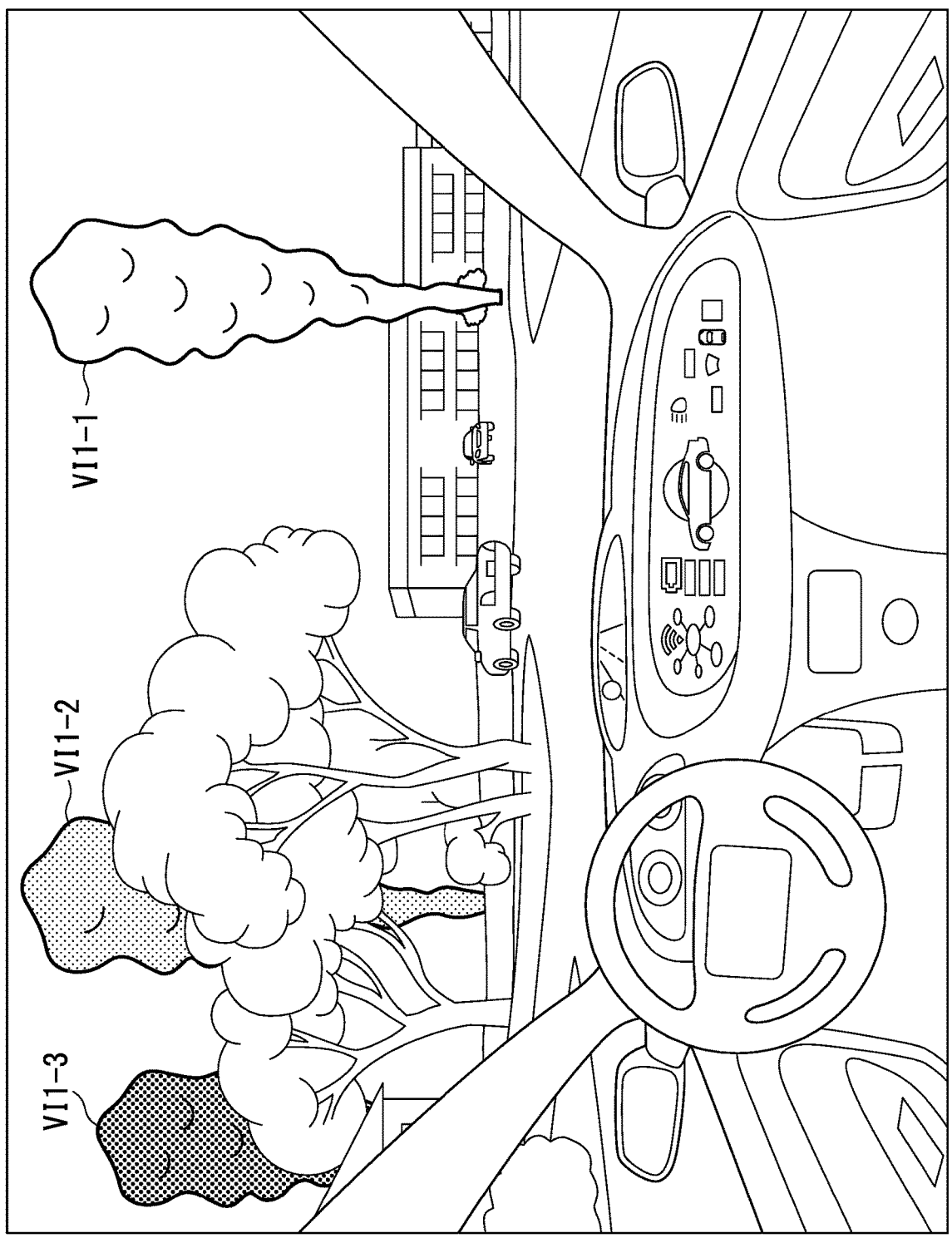
FIG. 9 is a diagram illustrating another example of a representation of the image VI1.

In the above description, a case where the output controller 128 causes the destination image VI1 indicating the destination DP input by the occupant to appear has been described, but the present invention is not limited thereto. FIG. 9 is a diagram illustrating another example of the representation of the destination image VI1. For example, the output controller 128 may communicate with other vehicles (for example, other vehicles m2 to m3) that are present in the vicinity of the own vehicle M by communication between vehicles and may cause the destination image VI1 (destination images VI1-2 to VI1-3 shown in the drawing) indicating a position where the other vehicles are designated as the destination to appear. Therefore, even in a case where the occupant does not designate the destination DP, it is possible to notify the occupant of the destination DP specified by an occupant of the other vehicle and enhance an entertainment of a drive. In this case, the destination images VI1-2 to VI1-3 according to the destination DP of the other vehicle may appear in an aspect (for example, a different color) different from that of the destination images VI1-1 according to the destination DP of the own vehicle M.

A shape (for example, a color) of the destination image VI1 may be determined according to ease of arrival. For example, in a case where a way to the destination DP is congested, the destination image VI1 may appear as a signal fire of a warm color system. In a case where a movement route to the destination DP is changed to a vacant route by the navigation device 20, the destination image VI1 may appear as a signal fire of a cold color system. The destination image VI1 may have a constitution in which a color of signal fire is changed according to a degree of congestion.

The destination image VI1 may be caused to appear (be updated) at a timing when new information (for example, a new destination DP) is acquired. There is a possibility that a position where a plurality of own vehicles M and the other vehicles gather is a popular spot. In a case where a plurality of other vehicles on which the output control system 1 is mounted gather at a certain position, the output controller 128 may acquire the position where there is a possibility of a popular spot by the communication between vehicles, cause the destination image VI1 of which the destination DP is the acquired position to appear, and notify the occupant of the destination image VI1. In a case where the plurality of own vehicles M and the other vehicles gather at a certain position, the information presentation device 100 may transmit information indicating the position thereof to the other vehicle on which the output control system 1 is mounted and urge the output control system 1 to cause the destination image VI1 to appear.

[Regarding Stop of the Image VI]

In a case where the own vehicle M arrives at the destination DP, the output controller 128 controls the image generator 40 to stop the appearance of the destination image VI1. Here, in a case where the appearance of the destination image VI1 is stopped as soon as the vehicle M arrives at the destination DP, the occupant may not ascertain the destination DP and may pass through the destination DP in some cases. Therefore, the output controller 128 controls the image generator 40 to stop the appearance of the destination image VI1 after a predetermined time has elapsed since the own vehicle M arrives at the destination DP.

In the above description, a case where the destination image VI1 is the image VI indicating, for example, the direction of the destination DP and the distance of the destination DP has been described, but the present invention is not limited thereto. The destination image VI1 may be, for example, an image VI at least indicating the direction of the destination DP. In this case, the output controller 128 always causes the destination image VI1 to appear by a predetermined size without the determination of the aspect (for example, a size) of the destination image VI1, on the basis of the distance deriver 126.

[Processing Flow]

Figure 10:
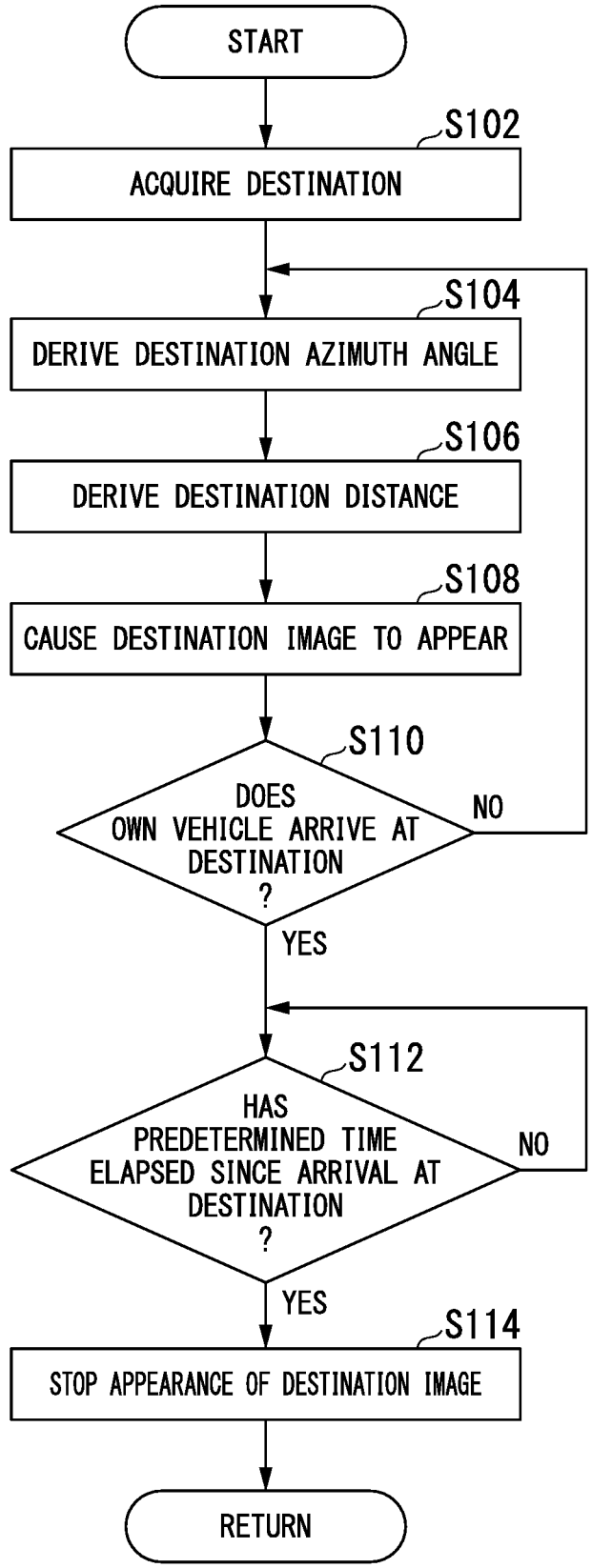
FIG. 10 is a flowchart illustrating an example of processing of an information presentation device 100 of the first embodiment.

FIG. 10 is a flowchart illustrating an example of processing of the information presentation device 100 of the first embodiment. The flowchart shown in FIG. 10 is repeatedly executed at a predetermined time interval. The first position acquirer 121 acquires the information indicating the first position of the own vehicle M from the navigation device 20, and the target position acquirer 122 acquires the information indicating the destination DP from the navigation device 20 (step S102). Next, the direction deriver 124 derives the destination azimuth angle ψ1 of the destination DP with respect to the own vehicle M, on the basis of the first position acquired by the first position acquirer 121, the destination DP acquired by the target position acquirer 122, and the azimuth of the reference line of the own vehicle M detected by the vehicle sensor 30 (step S104). Next, the distance deriver 126 derives the destination distance L1 from the first position to the destination DP, on the basis of the first position of the own vehicle M and the destination DP (step S106). Next, the output controller 128 causes the destination image VI1 to appear on the basis of the derived destination azimuth angle ψ1 and the destination distance L1 (step S108).

Next, the output controller 128 repeats the processing from steps S104 to 108 until the own vehicle M arrives at the destination DP (step S110). Next, in a case where the own vehicle M arrives at the destination DP, the output controller 128 causes the destination image VI1 to appear until a predetermined time has elapsed since the arrival at the destination DP (step S112; NO). Next, the output controller 128 causes the image generator 40 to stop the appearance of the destination image VI1 after the predetermined time has elapsed since the own vehicle M arrives at the destination DP (step S114).

[Summary of the First Embodiment]

According to the information presentation device 100 of the first embodiment described above, a predetermined user (the occupant in this example) can include the image generator 40 that causes the image (the destination image VI1 in this example) that looks superimposed on the scenery of the real space to appear, the target position acquirer 122 that acquires the target position (the destination DP in this example) on the real space where the destination image VI1 is caused to appear, the direction deriver 124 that derives the direction (the destination azimuth angle ψ1 in this example) to cause the occupant to view the destination image VI1, and the output controller 128 that controls the image generator 40 so that the destination image VI1 is viewed in the destination azimuth angle ψ1 as viewed from the occupant. The occupant can intuitively ascertain the direction of the destination DP.

According to the information presentation device 100 of the first embodiment, the information presentation device 100 further includes the distance deriver 126 that derives the distance (the destination distance L1 in this example) between the destination DP and the occupant (the own vehicle M). The output controller 128 may enlarge the destination image VI1 viewed by the occupant as the destination distance L1 becomes smaller and may represent the perspective of the destination DP to the occupant.

According to the information presentation device 100 of the first embodiment, in a case where the destination distance L1 is equal to or longer than a predetermined distance, the output controller 128 fixes the size of the destination image VI1 to the predetermined size. Therefore, it is possible to prevent the difficulty in ascertaining the destination DP by the occupant.

According to the information presentation device 100 of the first embodiment, the destination image VI1 (the image VI) is an image (the signal fire in this example) extending from the ground in the vertical direction. The output controller 128 causes the destination image VI1 to appear so as to shield the scenery behind the destination DP as viewed from the occupant and so as not to shield the scenery before the destination DP as viewed from the occupant. Therefore, it is possible to perform a guidance of the destination DP while providing a more realistic image to the occupant.

According to the information presentation device 100 of the first embodiment, the information presentation device 100 further includes a real space recognizer (the vehicle sensor 30 in this example) that recognizes the situation of the real space. The output controller 128 determines an aspect of the destination image VI1 according to the situation of the real space recognized by the vehicle sensor 30. For example, the vehicle sensor 30 recognizes the wind movement in the real space, and the output controller 128 determines the aspect of the destination image VI1 according to the wind movement. Therefore, the information presentation device 100 of the first embodiment can perform a guidance of the destination DP while providing a more realistic image to the occupant.

Second Embodiment

Hereinafter, the second embodiment of the present invention will be described. In the second embodiment, a case where the occupant performs various operations on the appearing image VI will be described. The same reference numerals are given to the same constitutions as those of the above-described embodiment and descriptions thereof will be omitted.

Figure 11:
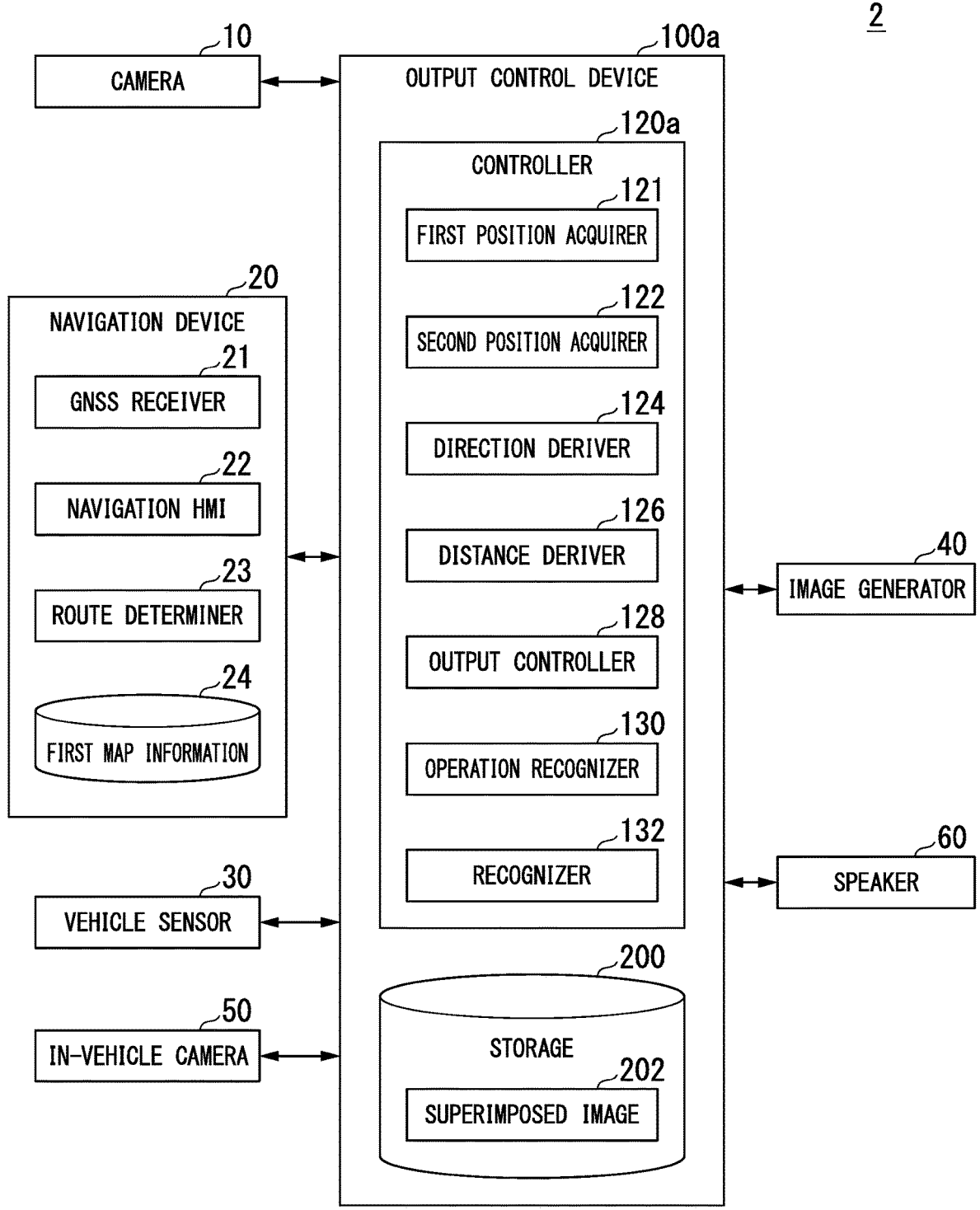
FIG. 11 is a diagram illustrating an example of a constitution of an output control system 2 of a second embodiment.

FIG. 11 is a diagram illustrating an example of a constitution of an output control system 2 of the second embodiment. In addition to the constitution included in the output control system 1, the output control system 2 includes an in-vehicle camera 50 and a speaker 60. The output control system 2 includes an information presentation device 100a instead of (or in addition to) the information presentation device 100.

For example, the in-vehicle camera 50 images the occupant seated on a seat installed in an interior of the own vehicle M. For example, the occupant may be an occupant seated on a driver's seat (hereinafter referred to as a driver), but in addition to the driver, the occupant may be an occupant (a fellow passenger) seated on a passenger seat or a rear seat. For example, the in-vehicle camera 50 is a digital camera using a solid state imaging element such as a CCD or a CMOS. For example, the in-vehicle camera 50 images the occupant at a predetermined timing. The captured image of the in-vehicle camera 50 is output to the information presentation device 100a.

The speaker 60 operates under a control of the information presentation device 100a and outputs a sound. The output control system 2 may include a buzzer instead of the speaker 60 as long as the buzzer is able to inform the occupant of information by a sound.

The information presentation device 100a includes a controller 120a instead of (or in addition to) the controller 120. The controller 120a includes the first position acquirer 121, the target position acquirer 122, the direction deriver 124, the distance deriver 126, the output controller 128, an operation recognizer 130, and a recognizer 132.

The operation recognizer 130 recognizes an operation of the occupant on the basis of the image captured by the in-vehicle camera 50. Here, for example, the operation of the occupant is an operation indicated by an action such as a gesture. The output controller 128 determines the aspect of the image VI on the basis of a recognition result of the operation recognizer 130.

Returning to FIG. 11, the recognizer 132 recognizes the line of sight of the occupant on the basis of the image captured by the in-vehicle camera 50. In a case where a recognition result of the recognizer 132 indicates that the occupant is not viewing the image VI, the output controller 128 causes the speaker 60 to output a sound indicating the direction of the destination DP.

[Regarding the Recognition Result by the Operation Recognizer 130]

Figure 12:
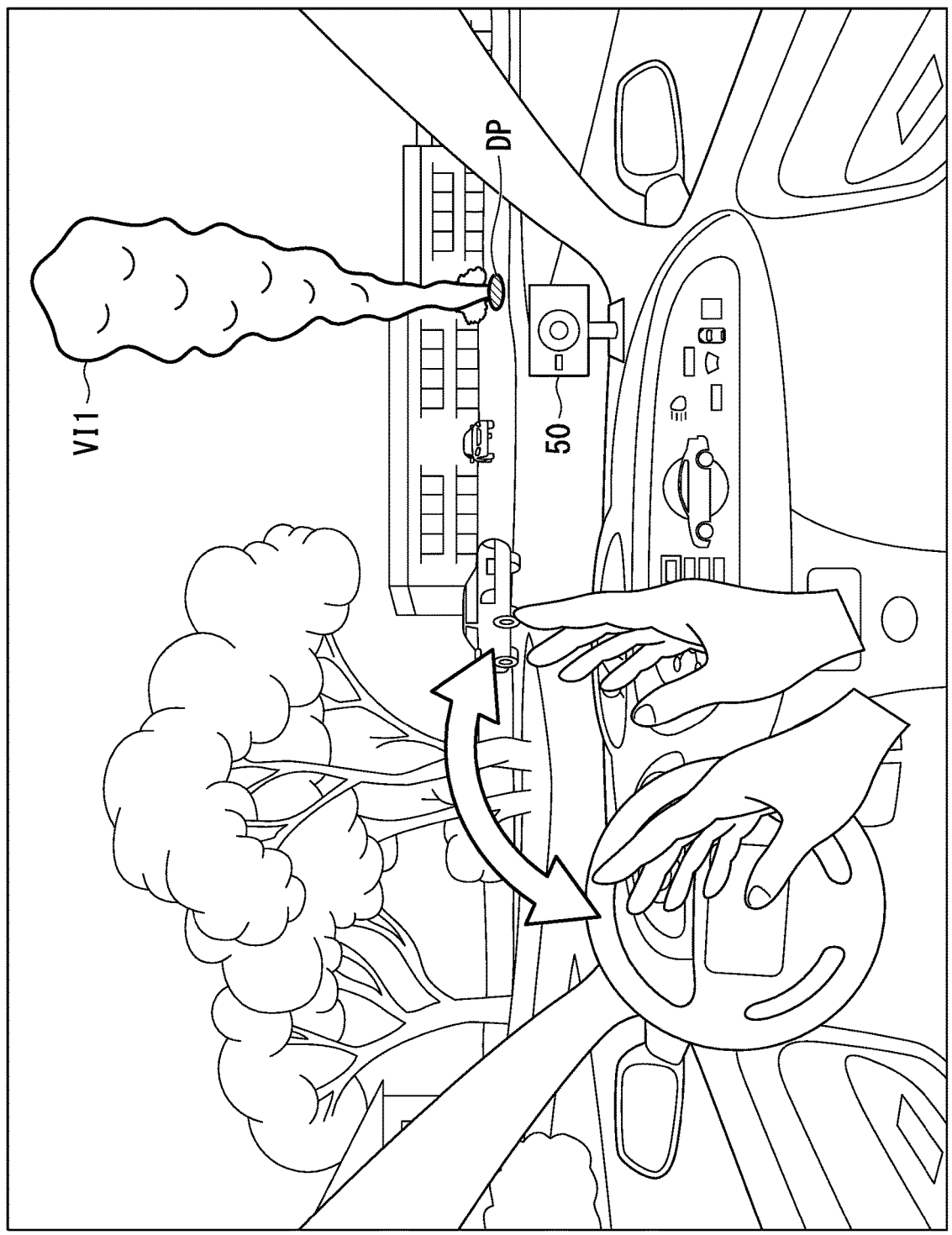
FIG. 12 is a diagram illustrating an example of an operation recognized by an operation recognizer 130.

FIG. 12 is a diagram illustrating an example of the operation recognized by the operation recognizer 130. In the example shown in FIG. 12, the operation recognizer 130 recognizes a gesture that the occupant brushes the signal fire of the destination image VI1, on the basis of the image captured by the in-vehicle camera 50. An operation for canceling (deleting) the destination image DP corresponds to the gesture in advance. Since the recognition result of the operation recognizer 130 indicates "the gesture for deleting the signal fire of the destination image VI1", the output controller 128 causes the image generator 40 to stop the appearance of the destination image VI1 and provides information indicating a deletion of the destination DP to the navigation device 20. Therefore, the occupant can easily delete the destination DP.

Figure 13:
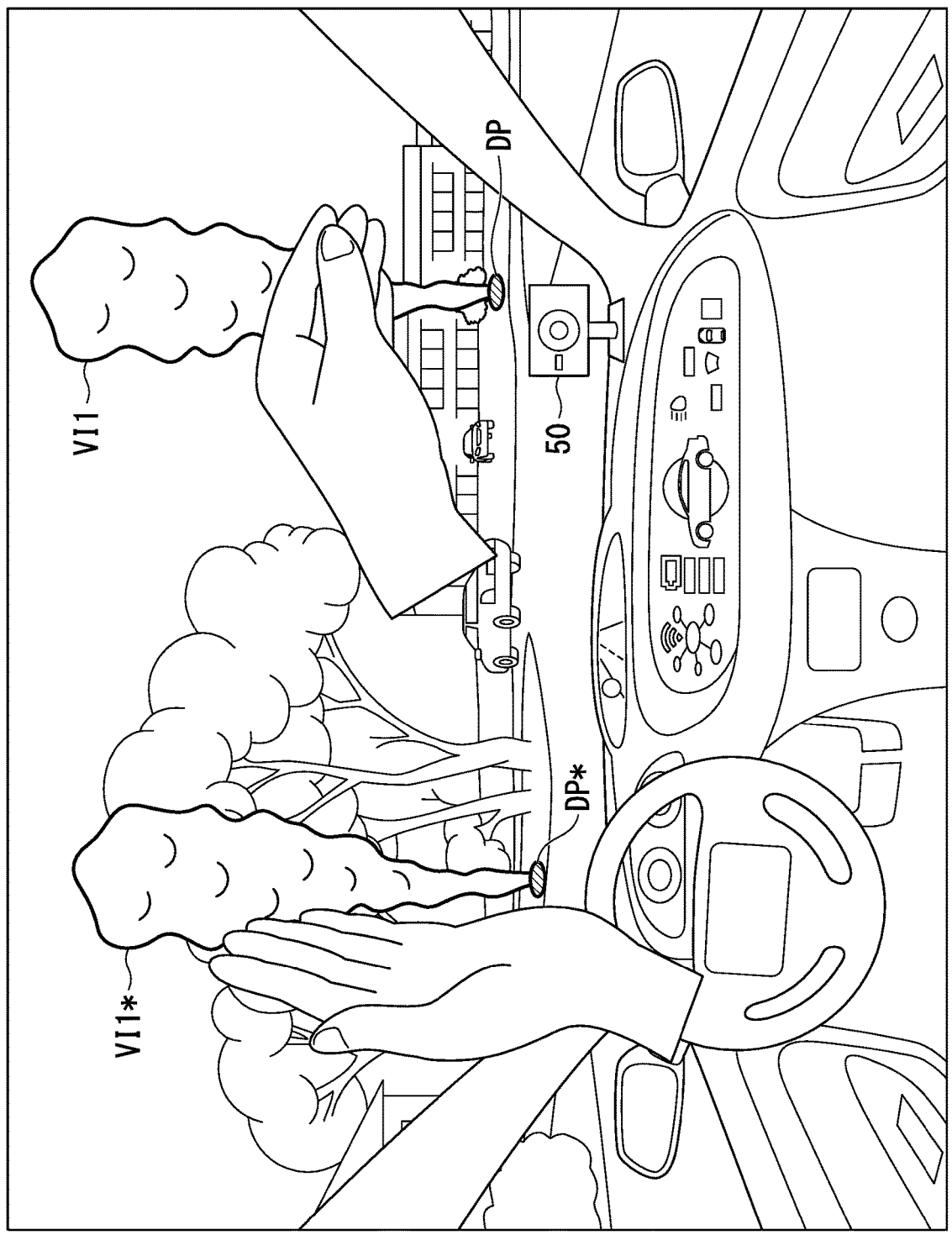
FIG. 13 is a diagram illustrating another example of the operation recognized by the operation recognizer 130.

FIG. 13 is a diagram illustrating another example of the operation recognized by the operation recognizer 130. In the example shown in FIG. 13, the operation recognizer 130 recognizes a gesture that the occupant grips the signal fire of the destination image VI1 and places the signal fire at another position, on the basis of the image captured by the in-vehicle camera 50. An operation for changing the destination DP is associated with the gesture in advance. Since so that the recognition result of the operation recognizer 130 indicates "the gesture for gripping the signal fire of the destination image VI1 and placing the signal fire at the other position", the output controller 128 provides information setting an another separated position (a new destination DP* shown in the drawing) from the destination image VI1 to a new destination to the navigation device 20. Therefore, the occupant can easily change the destination DP.

The output controller 128 may cause the destination image VI1 indicating a trajectory of a movement to appear while the occupant grips the destination image VI1 and moves the destination image VI1 to another position.

Figure 14:
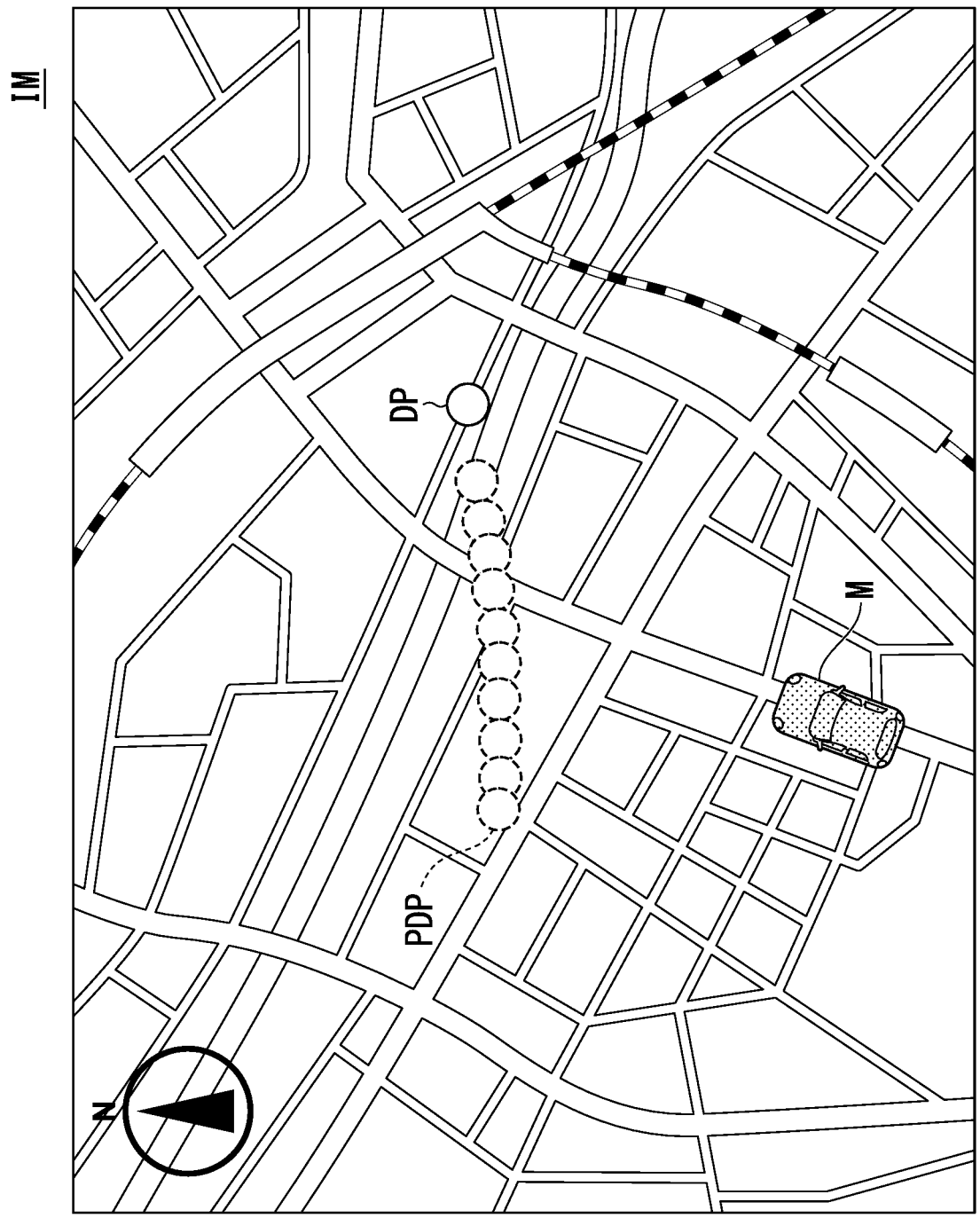
FIG. 14 is a diagram illustrating an example of a display screen of a navigation HMI 22 when changing a destination DP.

FIG. 14 is a diagram illustrating an example of a display screen of the navigation HMI 22 when changing the destination DP. In a case where the occupant grips the destination image VI1 and changes the destination DP, there is a case where the occupant wants to change the new destination DP* to a position other than the position viewed from the own vehicle M (that is, a position indicated in the image captured by the camera 10). In this case, although the signal fire of the destination image VI1 is gripped as described above, it is impossible to perform a gesture for placing the signal fire at the position of the new destination DP*. Therefore, as shown in FIG. 14, the output controller 128 displays a destination image DPD indicating the new destination DP* on the navigation HMI 22 of the navigation device 20.

Specifically, in a case where the recognition result of the operation recognizer 130 indicates that a predetermined time has elapsed after the gesture for gripping the signal fire of the destination image VI1, the output controller 128 displays the destination image DPD indicating the new destination DP* on the map displayed on the navigation HMI 22. In a case where predetermined time has elapsed after the gesture for gripping the signal fire of the destination image VI1, for example, since it is impossible to perform the gesture for placing the signal fire at the new destination DP*, a state in which the signal fire is gripped continues.

While the recognition result of the operation recognizer 130 indicates that the occupant grips the destination image VI1 and moves the destination image VI1 to the new destination DP*, the output controller 128 may superimpose and display the destination image DPD indicating a movement trajectory of the new destination DP* on the map displayed on the navigation HMI 22. In a case where the recognition result of the operation recognizer 130 indicates that the gesture for releasing the signal fire is recognized, the direction deriver 124 and the distance deriver 126 acquires a position of the destination image DPD on the map displayed on the navigation HMI 22 as the new destination DP* from the navigation device 20 at a timing when the gesture is recognized. The direction deriver 124 and the distance deriver 126 derive the destination distance L1 and the destination azimuth angle ψ1 on the basis of the new destination DP*, and the output controller 128 causes the destination image VI1 to appear at the new destination DP*.

[Regarding the Recognition Result by the Recognizer 132]

Figure 15:
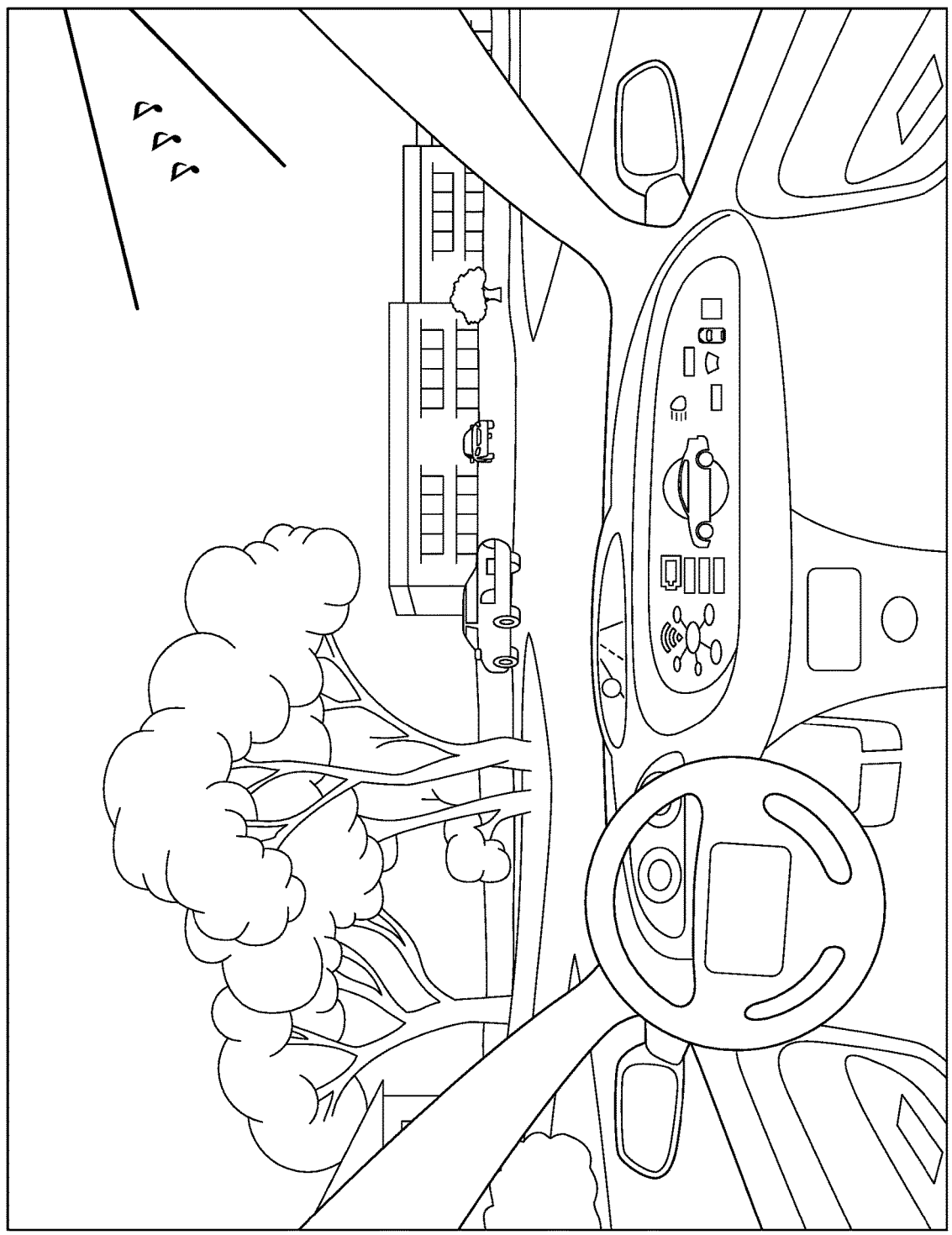
FIG. 15 is a diagram illustrating an example of a notification to an occupant according to a recognition result of a recognizer 132.

FIG. 15 is a diagram illustrating an example of the notification to the occupant according to the recognition result of the recognizer 132. Here, depending on a positional relationship between a progression direction of the own vehicle M and the destination DP, there is a case where the destination image VI1 does not appear in front of the own vehicle M, the occupant is not able to view the destination image VI, or the user is inadvertent of the front by viewing the destination image VI1 in some cases. In a case where the recognition result of the recognizer 132 indicates that the occupant is not viewing the destination image VI1, the output controller 128 causes a speaker 60 installing in a direction of the destination azimuth angle ψ1 derived by the direction deriver 124 among a plurality of speakers 60 installed in the own vehicle M to output information (for example, a notification sound) indicating the destination DP. Therefore, although the occupant cannot view the destination image VI1, the occupant can intuitively ascertain the direction of the destination image DP.

The output controller 128 may cause the speaker 60 to output a sound of a message such as "the destination is a right direction" instead of the notification sound. Instead of the speaker 60, the output controller 128 may control an light emitting diode (LED) light installed in the direction of the destination azimuth angle ψ1 to blink among a plurality of LED lights installed in the interior of the own vehicle M to inform the destination DP or may generates a vibration by a vibrator of a position according to the direction of the destination azimuth angle ψ1 among vibrators provided on a circumferential outer periphery of a steering wheel of the own vehicle M to inform (notify) the destination DP.

Figure 16:
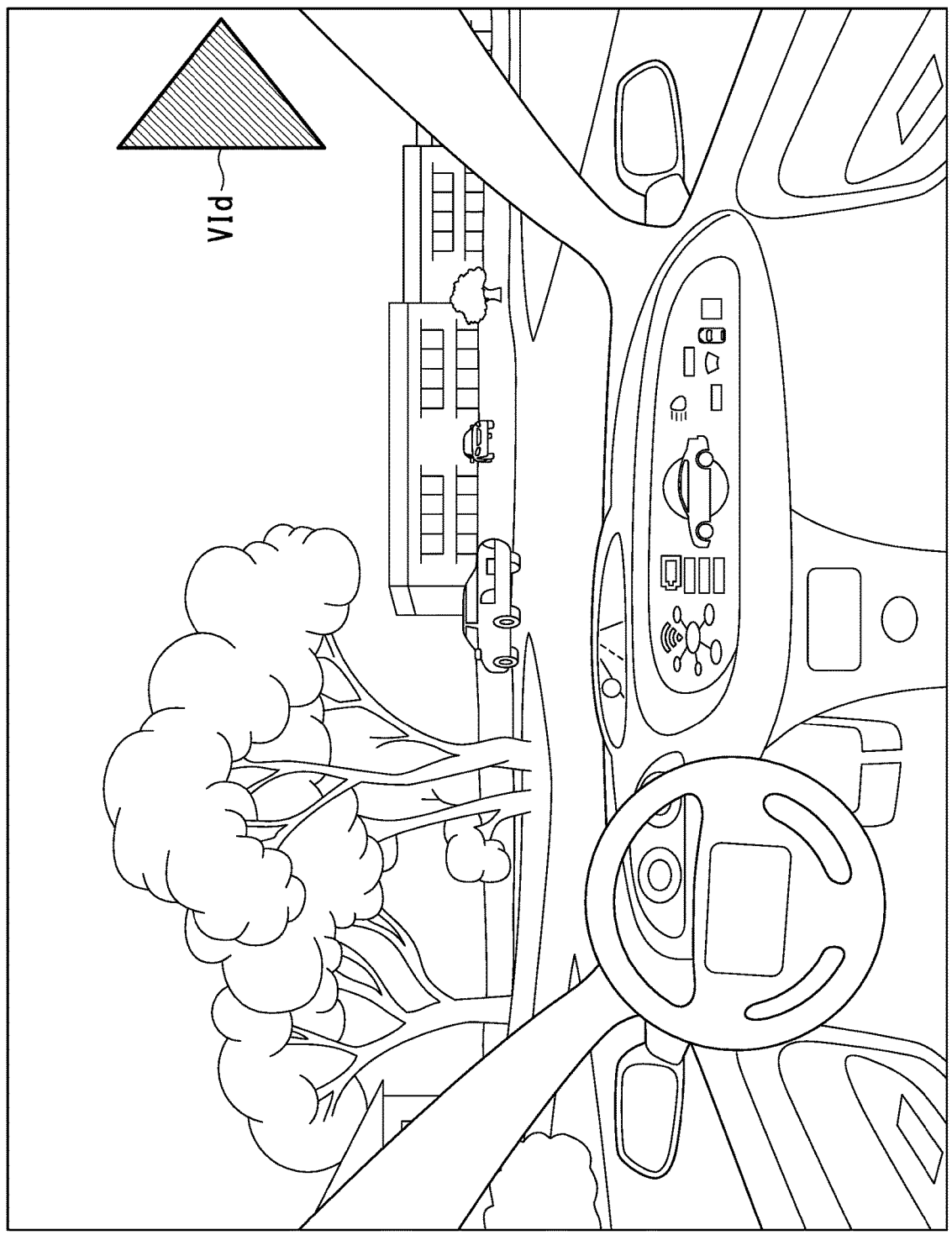
FIG. 16 is a diagram illustrating another example of the notification to the occupant according to the recognition result of the recognizer 132.

FIG. 16 is a diagram illustrating another example of the notification to the occupant according to the recognition result of the recognizer 132. For example, in a case where the recognition result of the recognizer 132 indicates that the occupant is not viewing the destination image VI1, the output controller 128 may cause the image generator 40 such that the image VI other than the destination image VI1 is caused to appear. For example, the image VI may be an instruction image VId such as an arrow indicating the destination azimuth angle ψ1. Therefore, although the occupant cannot view the destination image VI1, the occupant can intuitively ascertain the direction of the destination image DP by the instruction image VId.

[Processing Flow]

Figure 17:
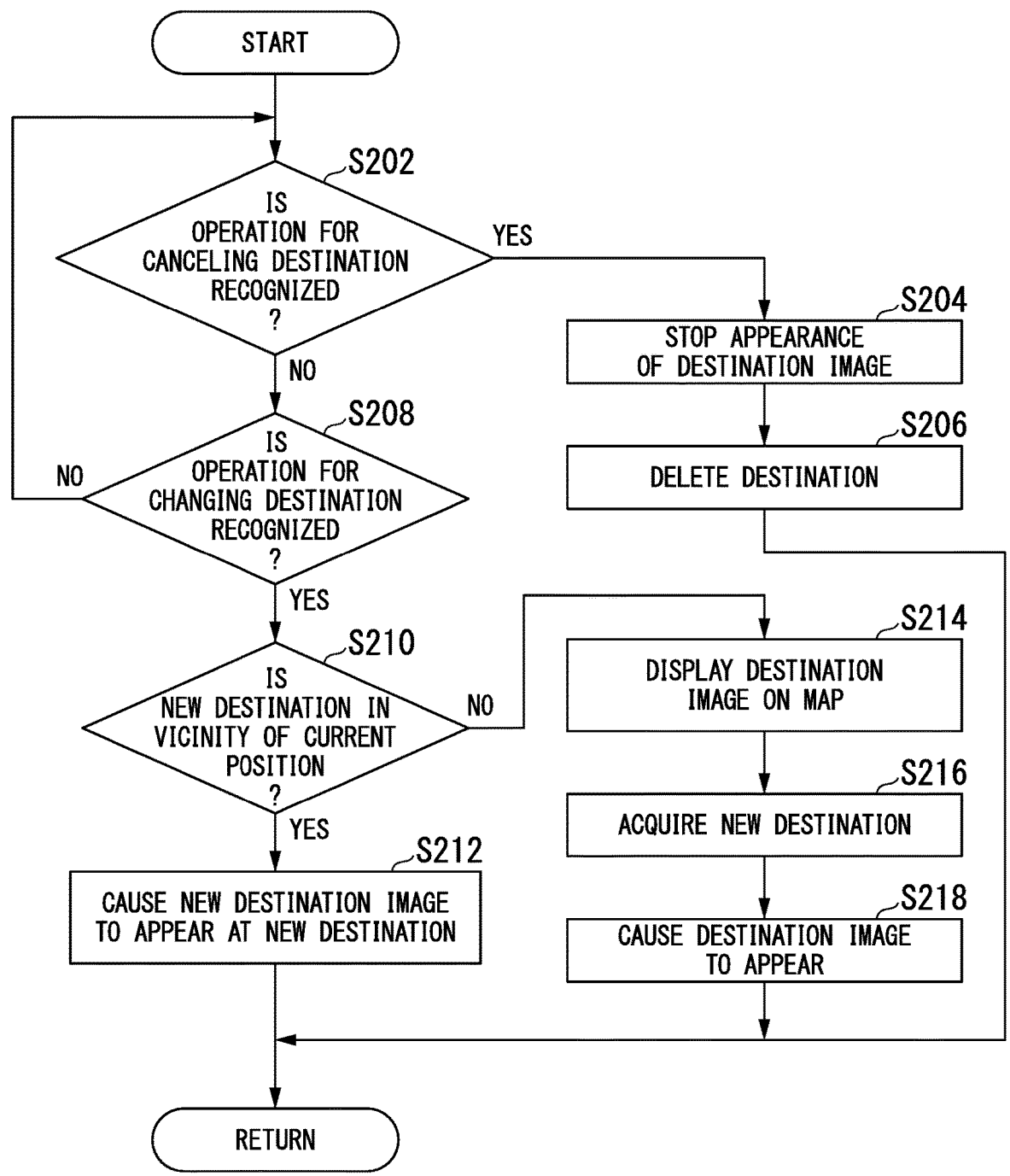
FIG. 17 is flowchart illustrating an example of processing related to the operation recognizer 130 of an information presentation device 100a of the second embodiment.

FIG. 17 is flowchart illustrating an example of processing related to the operation recognizer 130 of the information presentation device 100a of the second embodiment. The flowchart shown in FIG. 17 is repeatedly executed at a predetermined time interval. First, the output controller 128 determines whether or not the recognition result of the operation recognizer 130 indicates the gesture for canceling the destination DP (for example, the gesture for brushing the signal fire by a hand) (step S202). In a case where the recognition result of the operation recognizer 130 indicates the gesture for canceling the destination DP, the output controller 128 causes the image generator 40 to stop the appearance of the destination image VI1 (step S204). Next, the output controller 128 outputs the information indicating that the destination DP is deleted to the navigation device 20, deletes the destination DP (step S206), and ends the processing.

In a case where the recognition result of the operation recognizer 130 does not indicate the gesture for canceling the destination DP, the output controller 128 determines whether or not the recognition result of the operation recognizer 130 indicates the gesture for changing the destination DP (for example, the gesture for gripping the signal fire) (step S208). In a case where the recognition result of the operation recognizer 130 does not indicate the gesture for changing the destination DP, the output controller 128 proceeds to the processing to step S202. Next, in a case where the recognition result of the operation recognizer 130 indicates the gesture for changing the destination DP, the output controller 128 determines whether or not the new destination DP* indicated by the gesture is in the vicinity of the first position of the own vehicle M (step S210). Next, in a case where the new destination DP* indicated by the gesture is in the vicinity of the first position of the own vehicle M, the output controller 128 causes the destination image VI1 to appear at the new destination DP* indicated by the gesture (step S212).

Next, in a case where the recognition result of the operation recognizer 130 indicates that the new destination DP* is not in the vicinity of the first position (for example, the predetermined time has elapsed after the gesture for gripping the signal fire), the output controller 128 displays the destination image DPD on the map displayed on the navigation HMI 22 (step S214). Next, the direction deriver 124 and the distance deriver 126 acquires the position of the destination image DPD on the map displayed on the navigation HMI 22 as the new destination DP* at the timing when the gesture for brushing the signal fire is recognized (step S216). Next, the direction deriver 124 and the distance deriver 126 derive the destination distance L1 and the destination azimuth angle ψ1 on the basis of the new destination DP*, and the output controller 128 causes the destination image VI1 to appear at the new destination DP* on the basis of the derived destination distance L1 and the destination azimuth angle ψ1 (step S218).

Figure 18:
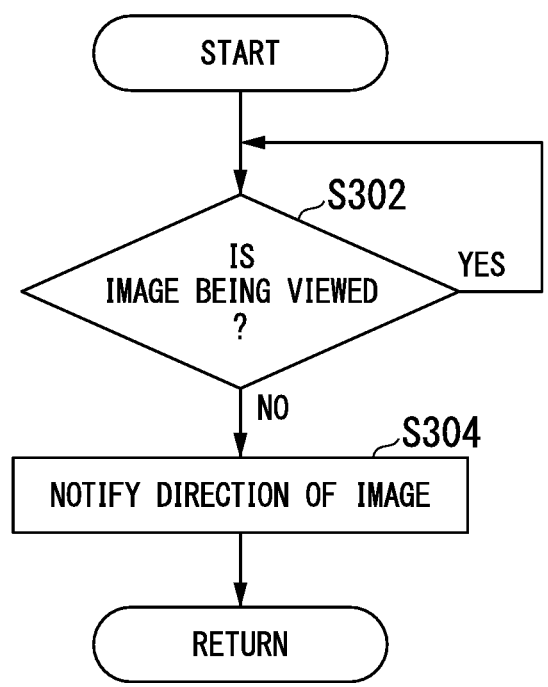
FIG. 18 is a flowchart illustrating an example of processing related to the recognizer 132 of the information presentation device 100a of the second embodiment.

FIG. 18 is a flowchart illustrating an example of processing related to the recognizer 132 of the information presentation device 100a of the second embodiment. The flowchart shown in FIG. 18 is repeatedly executed at a predetermined time interval. First, the output controller 128 determines whether or not the recognition result of the recognizer 132 indicates that the occupant is viewing the destination image VI1 (step S302). The output controller 128 waits without performing the processing until the recognition result of the recognizer 132 indicates that the occupant is not viewing the destination image VI1. Next, in a case where the recognition result of the recognizer 132 indicates that the occupant is not viewing the destination image VI1, the output controller 128 notifies the direction of the destination DP by causing the speaker 60, the LED light, the vibrator, or the instruction image VId to appear (step S304).

[Summary of the Second Embodiment]

The information presentation device 100a of the second embodiment described above further includes an operation recognizer (the in-vehicle camera 50 in this example) that recognizes a content of an operation of the occupant. The output controller 128 moves or deletes the destination image VI1 on the basis of the content of the operation. Therefore, the information presentation device 100a of the second embodiment can enable the occupant to easily change the destination DP.

The information presentation device 100a of the second embodiment described above includes an operation recognizer (the in-vehicle camera 50 in this example) that detects the line of sight of the occupant, and a notificator (the speaker 60 or the image generator 40 in this example) that outputs the information (the notification sound or the instruction image VId in this example) indicating the direction of the destination DP to the occupant in a case where a recognition result of the in-vehicle camera 50 indicates that the occupant is not viewing the image (the destination image VI1 in this example). It is possible to notify the direction of the destination DP although the occupant is not viewing the destination image VI1.

Third Embodiment

Hereinafter, the third embodiment of the present invention will be described. In the above-described embodiment, a case where the destination image VI1 is caused to appear at the destination DP of the occupant has been described. In the third embodiment, a case where the image VI is caused to appear at a predetermined position set in advance will be described. The same reference numerals are given to the same constitutions as those of the above-described embodiment and descriptions thereof will be omitted.

Figure 19:
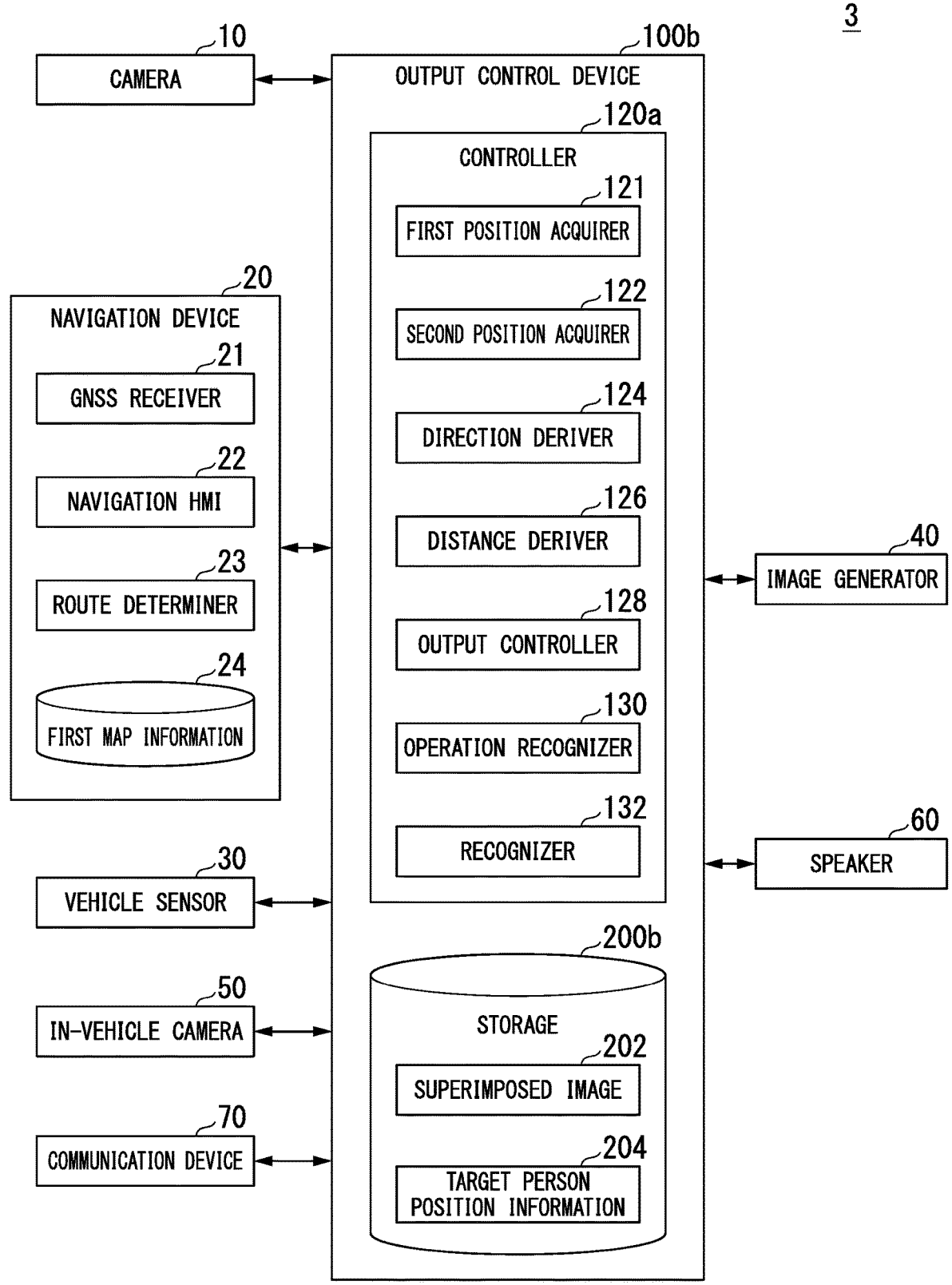
FIG. 19 is a diagram illustrating an example of a constitution of an output control system 3 of a third embodiment.

FIG. 19 is a diagram illustrating an example of a constitution of an output control system 3 of the third embodiment. In addition to the constitution included in the output control system 1 or the output control system 2, the output control system 3 includes a communication device 70. The output control system 3 includes an information presentation device 100b instead of (or in addition to) the information presentation device 100 and the information presentation device 100a. The information presentation device 100b includes a controller 120a instead of (or in addition to) the controller 120. The information presentation device 100b includes a storage 200b.

For example, the communication device 70 communicates with other vehicles present in the vicinity of the own vehicle M using a cellular network, a Wi-Fi network, Bluetooth (registered trademark), a dedicated short range communication (DSRC), or the like, or communicates with various server devices through a wireless base station.

In the storage 200b, information indicating the superimposed image 202 and target person position information 204 are stored. For example, the target person position information 204 is information in which a target person set by the occupant of the own vehicle M in advance and information indicating a position of the target person (hereinafter, referred to as a target person position RP) are associated with each other. For example, the target person is a person whose occupant wants to ascertain a situation, and is a relative (for example, grandparents), a friend, or the like of the occupant. For example, the target person position RP is an address of the target person. The target person position RP is a second example of the "target position".

In a case where the target person included in the target person position information 204 has equipment (for example, a mobile phone) capable of acquiring the first position, that is equipment capable of transmitting and receiving information, the information indicating the first position (of the target person) may be transmitted to the communication device 70, and the target person position RP of the target person position information 204 may be sequentially updated. In the following description, a case where such updating is not performed on the target person position information 204 and the target person position RP is the address of the target person will be described.

Figure 20:
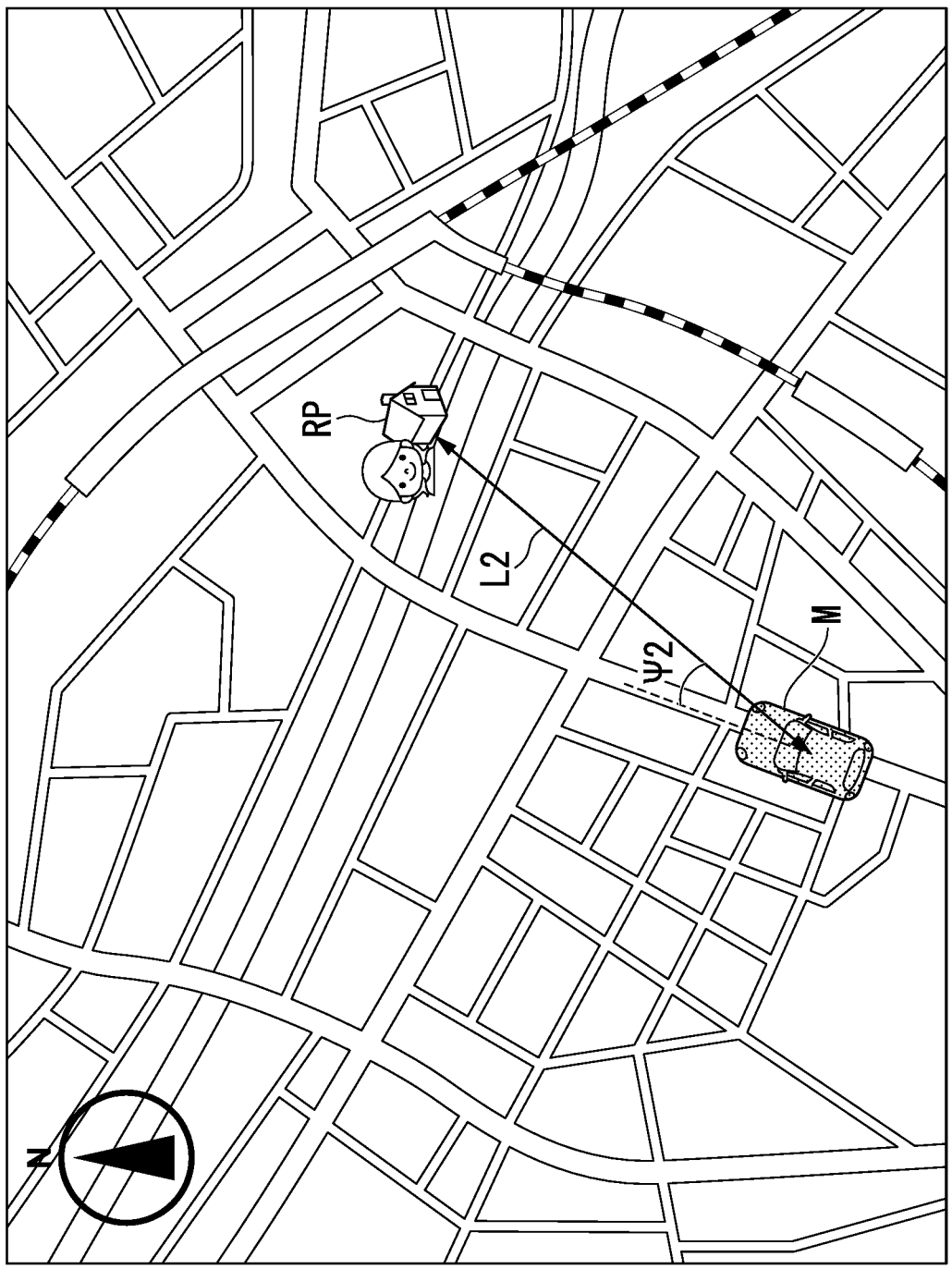
FIG. 20 is a diagram schematically illustrating an example of processing of a direction deriver 124 and a distance deriver 126 of the third embodiment.

FIG. 20 is a diagram schematically illustrating an example of processing of the direction deriver 124 and the distance deriver 126 of the third embodiment. the direction deriver 124 of the present embodiment derives an angle formed by a line segment connecting the first position of the own vehicle M and the target person position RP and the reference line of the own vehicle M as an azimuth angle of the target person position RP (hereinafter, referred to as a target person azimuth angle ψ2) with respect to the own vehicle M, on the basis of the first position of the own vehicle M, the target person position RP, and the azimuth of the reference line of the own vehicle M. The distance deriver 126 of the present embodiment derives a distance from the first position to the target person position RP (hereinafter, referred to as a target person distance L2), on the basis of the first position of the own vehicle M and the target person position RP indicated by the target person position information 204.

The output controller 128 controls the image generator 40 so that the a target person position image VI2 appears by superimposing the target person position image VI2 on the real space, on the basis of the target person azimuth angle ψ2 derived by the direction deriver 124 and the target person distance L2 derived by the distance deriver 126. The target person position image VI2 is an image VI indicating at least one of a direction of the target person position RP and a position of the target person position RP. In the following description, a case where the target person position image VI2 is an image VI that is viewed by the occupant as the signal fire extends in the vertical direction from the ground of the position of the target person position RP will be described.

[Regarding the Target Person Position Image VI2 Indicating the Target Person Position RP]

Figure 21:
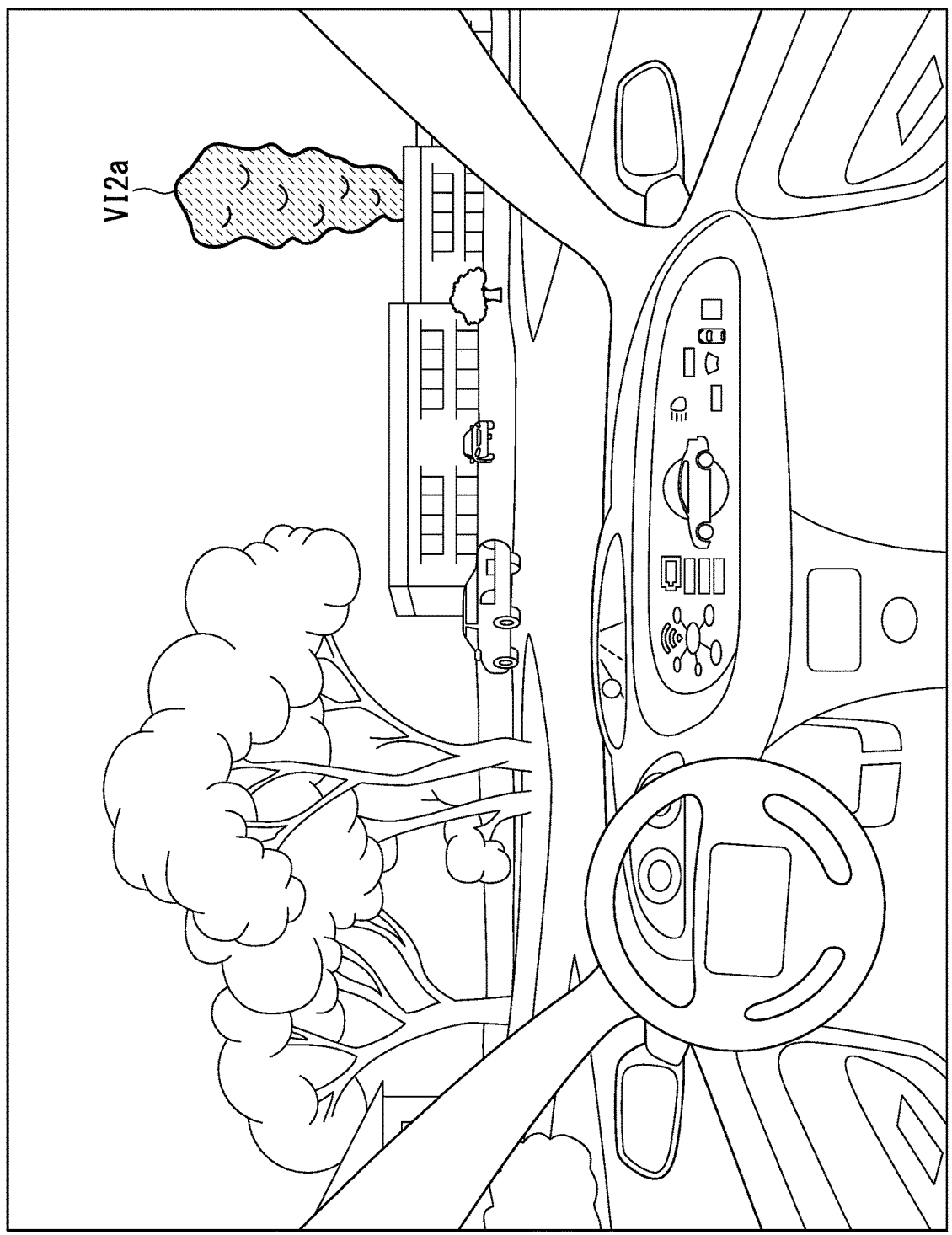
FIG. 21 is a diagram illustrating an example of a target person position image VI2 appearing by the image generator 40.

FIG. 21 is a diagram illustrating an example of the target person position image VI2 appearing by the image generator 40. In the example shown in FIG. 21, a target person position image VI2a is the image VI indicating the position of the target person position RP and is the target person position image VI2 appearing at the first position of the own vehicle M. Therefore, the occupant can intuitively ascertain a direction of the target person.

The output controller 128 may also perform the change of the size of the destination image VI1 according to the above-described destination distance L1, the representation of the destination image VI1 according to the situation of the real space, the notification of the direction of the destination image VI1, or the like on the target person position image VI2.

[Regarding the Representation of the Target Person Position Image VI2 According to a State of the Target Person]

The output controller 128 may represent the target person position image VI2 according to the state of the target person whose position is indicated by the target person position RP. In this case, the communication device 70 receives information indicating the state of the target person through a network. For example, the state of the target person includes at least one of a physical condition, sleeping, waking up, emotion, being at home or absence of the target person. For example, the target person has a portable communication terminal device such as a smart phone or a table type computer (a tablet PC), or a stationary terminal device (for example, a stationary personal computer or the like), that is equipment capable of communicating with the communication device 70. Such equipment transmits the information indicating the state of the target person to the communication device 70 at a timing based on an operation of transmitting the state of the target person by the target person.

The target person may have wearable equipment capable of detecting a vital sign of the target person in addition to the portable communication terminal device, the stationary terminal device, or the like. The wearable equipment may transmit the information indicating the state of the target person (for example, the vital sign) to the communication device 70 always or repeatedly at a predetermined time interval.

Figure 22:
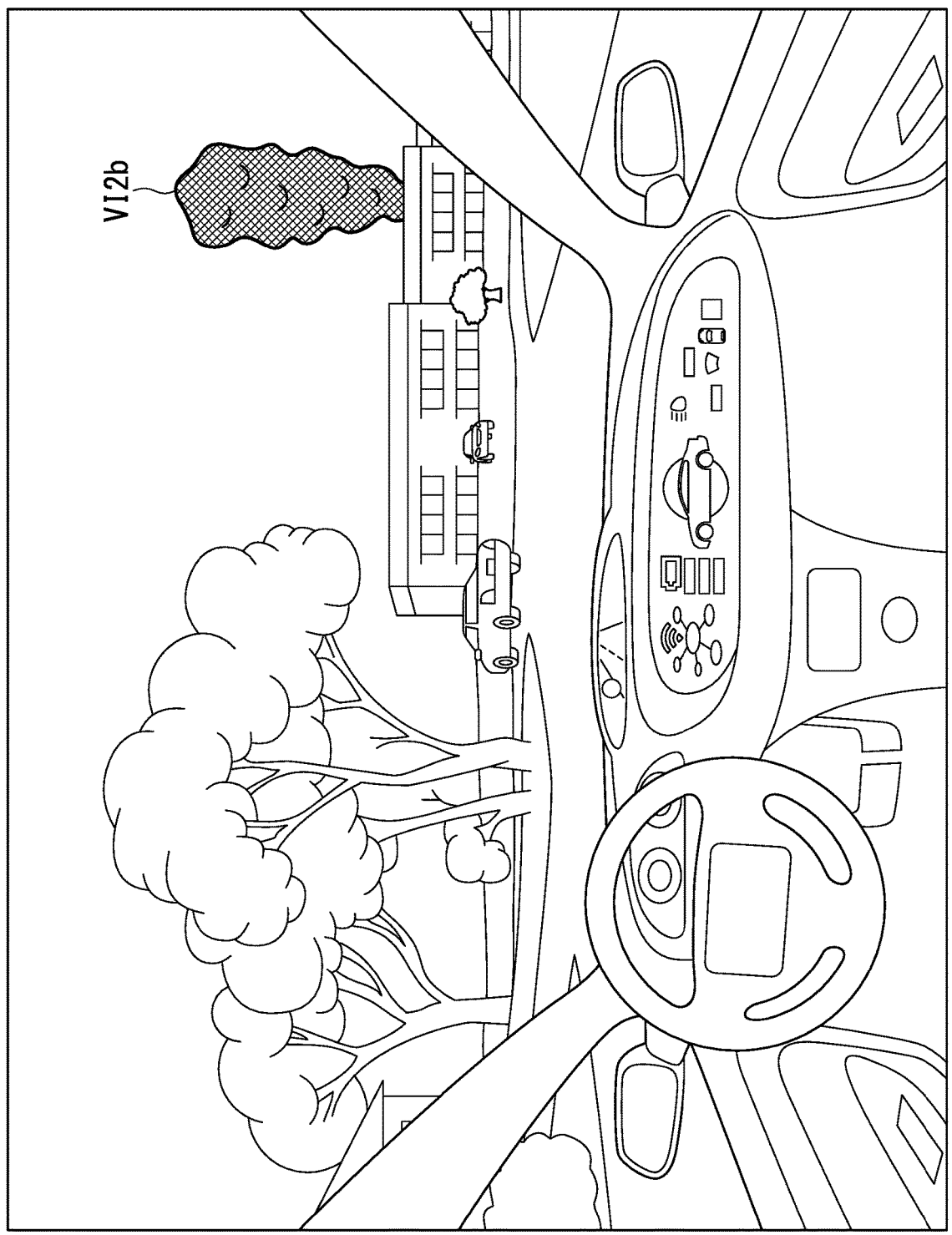
FIG. 22 is a diagram illustrating another example of the target person position image VI2 appearing by the image generator 40.

FIG. 22 is a diagram illustrating another example of the target person position image VI2 appearing by the image generator 40. For example, in a case where the physical condition of the target person received by the communication device 70 is normal, the output controller 128 causes a target person position image VI2a shown in FIG. 21 to appear, and in a case where the physical condition of the target person received is not normal, the output controller 128 causes a target person position image VI2b shown in FIG. 22 to appear. The target person position image VI2a is, for example, a signal fire of a cold color system, and the target person position image VI2b is, for example, a signal fire of a warm color system of the signal fire. Therefore, the occupant can easily and intuitively ascertain the state of the target person.

The output controller 128 may determine an aspect of the target person position image VI2 on the basis of the sleeping, waking up, emotion, being at home or absence, or the like of the target person, in addition to the physical condition of the target person.

[Regarding the Recognition Result by the Operation Recognizer 130]

The operation recognizer 130 of the present embodiment recognizes the gesture that the occupant grips a signal fire of the target person position image VI2 on the basis of the image captured by the in-vehicle camera 50. An operation for contacting the target person of the position of the target person position RP (for example, a call origination or a transmission of a fixed form mail) is associated with the gesture in advance. In a case where the recognition result of the operation recognizer 130 indicates "the gesture for gripping the signal fire of the target person position image VI2", the output controller 128 keeps in touch with the target person. Therefore, the occupant can easily keep in touch with the target person.

The output controller 128 may output the number of times of checking the target person position image VI2 by the occupant as a log to another equipment (for example, a terminal device of the occupant) on the basis of the recognition result of the recognizer 132.

[Processing Flow]

Figure 23:
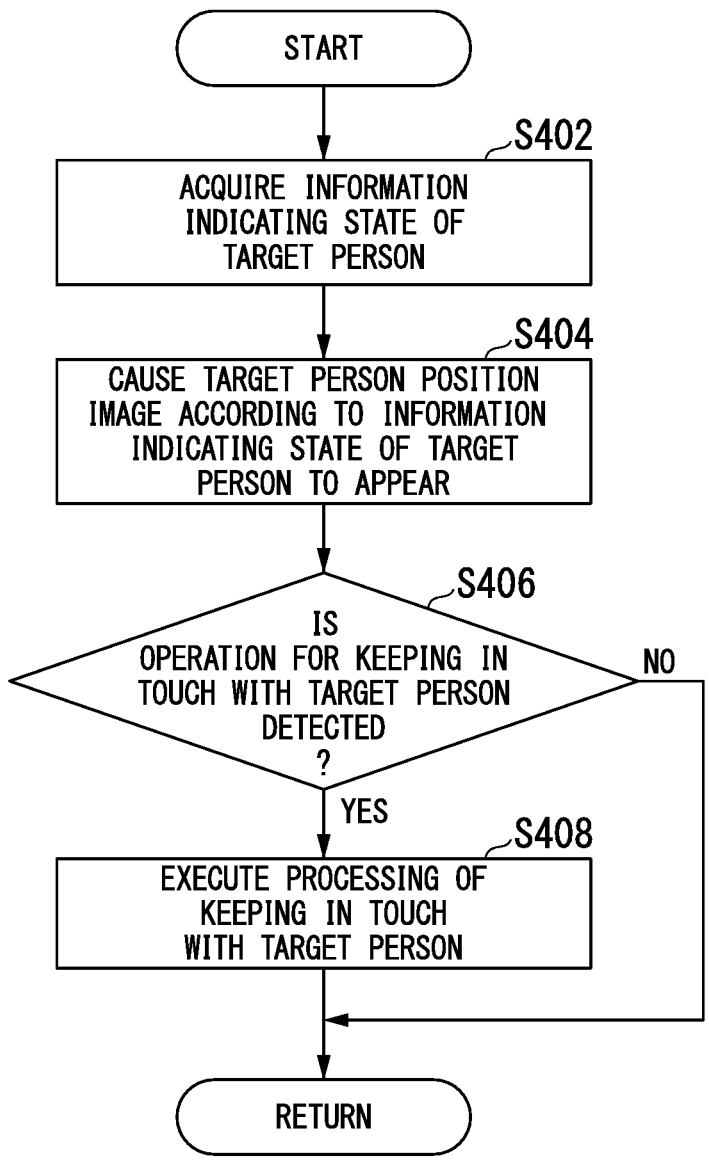
FIG. 23 is a flowchart illustrating an example of processing of the information presentation device 100a of the third embodiment.

FIG. 23 is a flowchart illustrating an example of processing of the information presentation device 100a of the third embodiment. The flowchart shown in FIG. 23 is repeatedly executed at a predetermined time interval. First, the communication device 70 receives the information indicating the state of the target person (step S402). Next, the output controller 128 causes the target person position image VI2 according to the received state of the target person to appear (step S404). Next, the output controller 128 determines whether or not the recognition result of the operation recognizer 130 indicates the gesture for keeping in touch with the target person (for example, the gesture for gripping the signal fire) (step S406). In a case where the gesture for keeping in contact with the target person is not recognized, the output controller 128 ends the processing. Next, in a case where the recognition result of the operation recognizer 130 indicates the gesture for keeping in touch with the target person, the output controller 128 executes processing of keeping in touch with the target person (for example, the call origination or the transmission of the fixed form mail) (step S408).

[Summary of the Third Embodiment]

In the information presentation device 100c of the third embodiment described above, a target position is the target person position RP of the target person designated by the occupant, and the occupant can intuitively ascertain the direction or the position of the target person.

In the information presentation device 100c of the third embodiment, the output controller 128 determines the aspect of the target person position image VI2 according to the state of the target person, and the occupant can easily and intuitively ascertain the state of the target person.

Fourth Embodiment

Hereinafter, the fourth embodiment of the present invention will be described. In the above-described embodiment, a case where the information presentation devices 100a and 100b are mounted on the own vehicle M has been described. In the fourth embodiment, a case where the information presentation device 100a is mounted on a terminal device TM of the user will be described. The same reference numerals are given to the same constitutions as those of the above-described embodiment and descriptions thereof will be omitted.

Figure 24:
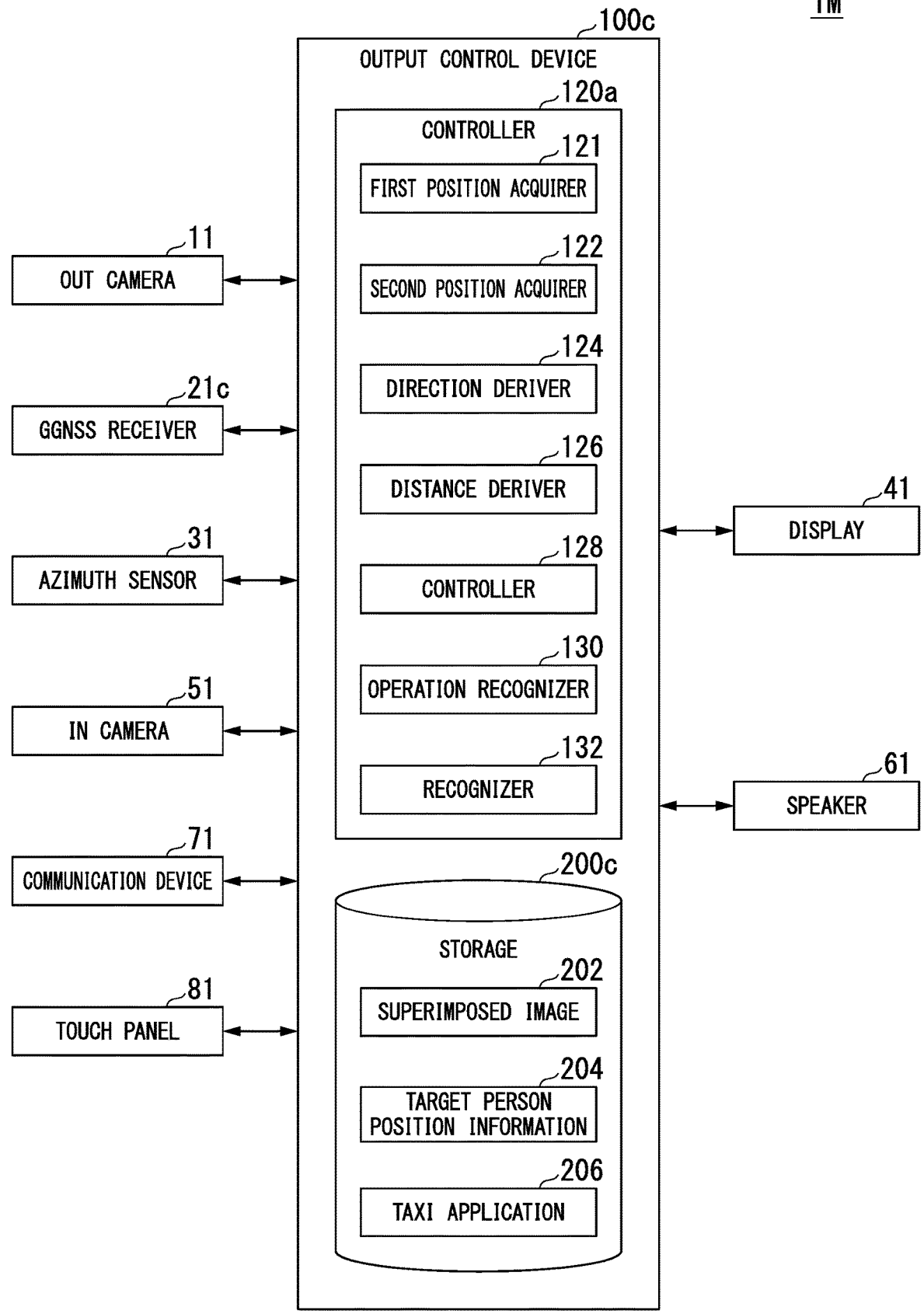
FIG. 24 is a diagram illustrating an example of a constitution of a terminal device TM of a fourth embodiment.

FIG. 24 is a diagram illustrating an example of a constitution of the terminal device TM of the fourth embodiment. The terminal device TM includes an out camera 11, a GNSS receiver 21c, an azimuth sensor 31, a display 41, an in camera 51, a speaker 61, a communication device 71, a touch panel 81, and an information presentation device 100c. For example, the terminal device TM is a portable communication terminal device such as a smart phone or a tablet type computer (a tablet PC). In the following description, a case where the terminal device TM is a tablet type portable device having a front surface and a rear surface will be described.

For example, the out camera 11 is a digital camera using a solid state imaging element such as a CCD or a CMOS. The out camera 11 is attached to an arbitrary place of the rear surface of the terminal device TM and images a direction of the rear surface of the terminal device TM (for example, the scenery of a progression direction of the user). The out camera 11 may be a stereo camera.

The GNSS receiver 21c has the same constitution as that of the above-described GNSS receiver 21 and specifies a current position of the terminal device TM on the basis of a signal received from a GNSS satellite.

The azimuth sensor 31 detects geomagnetism and detects an azimuth ahead of the terminal device TM. Specifically, the terminal device TM detects an azimuth of a reference line connecting a reference point and an upper portion of the terminal device TM, that is a reference line passing through a reference point (for example, a center of gravity) of the terminal device TM. Information indicating the azimuth is output to the information presentation device 100c.

The display 41 is, for example, a liquid crystal display panel or an organic electroluminescence display panel and displays various images under a control of the information presentation device 100c. The display 41 is provided on the front surface of the terminal device TM.

The in camera 51 has the same function as that of the out camera 11. The in camera 51 is attached to an arbitrary place of the front surface of the terminal device TM and images a direction of the front surface of the terminal device TM (for example, a face of the user).

The speaker 61 has the same function as that of the above-described speaker 60, operates by the control of the information presentation device 100c, and outputs a sound.

The communication device 71 has the same function as that of the above-described communication device 70 and communicates with the vehicles on which the output control systems 1 to 3 are mounted or other devices.

The touch panel 81 is provided on the front surface of the terminal device TM and receives an operation of the user. In the following description, a case where the display 41 and the touch panel 81 are integrally formed on the front surface of the terminal device TM will be described.

The information presentation device 100c includes a controller 120a and a storage 200c. In the storage 200c, the superimposed image 202, the target person position information 204, a taxi application 206 are stored. The controller 120a realizes an application having functions such as an allocation of a taxi, a payment of a fee after getting on a taxi, or a check of a taxi present in a vicinity of the terminal device TM, by executing the taxi application 206 stored in the storage 200c.

According to the execution of the taxi application 206 in the terminal device TM, the out camera 11 images the scenery of a direction in which the rear surface of the terminal device TM faces (or a direction the user is facing).

The first position acquirer 121 of the present embodiment acquires the information indicating the first position of the terminal device TM. The target position acquirer 122 acquires a position of the taxi present in the vicinity of the terminal device TM (hereinafter, referred to as a target vehicle position MP). The target vehicle position MP is a third example of the "target position".

The direction deriver 124 derives an angle formed by a line segment connecting the first position of the terminal device TM and the target vehicle position MP and the reference line of the terminal device TM as an azimuth angle of the target vehicle position MP (hereinafter, referred to as a target vehicle azimuth angle ψ3) with respect to the terminal device TM, on the basis of the first position of the terminal device TM acquired by the first position acquirer 121, the target vehicle position MP, and the azimuth of the terminal device TM detected by the azimuth sensor 31. The distance deriver 126 derives a distance from the first position to the target vehicle position MP (hereinafter, referred to as a target vehicle distance L3), on the basis of the first position acquired by the first position acquirer 121 and the target vehicle position MP acquired by the target position acquirer 122.

The output controller 128 controls the display 41 so that a target vehicle image VI3 appears (is displayed) by superimposing the target vehicle image VI3 on the image of the real space, on the basis of the target vehicle azimuth angle ψ3 derived by the direction deriver 124, the target vehicle distance L3 derived by the distance deriver 126, and the image of the real space captured by the out camera 11. The target vehicle image VI3 is the image VI indicating at least one of a direction of the target vehicle position MP and the position of the taxi. In the following description, a case where the target vehicle image VI3 is the image VI that is viewed by the occupant as the signal fire extends from the ground of the target vehicle position MP in the vertical direction will be described. The taxi is an example of a "target vehicle".

[Execution Screen of Taxi Application]

Figure 25:
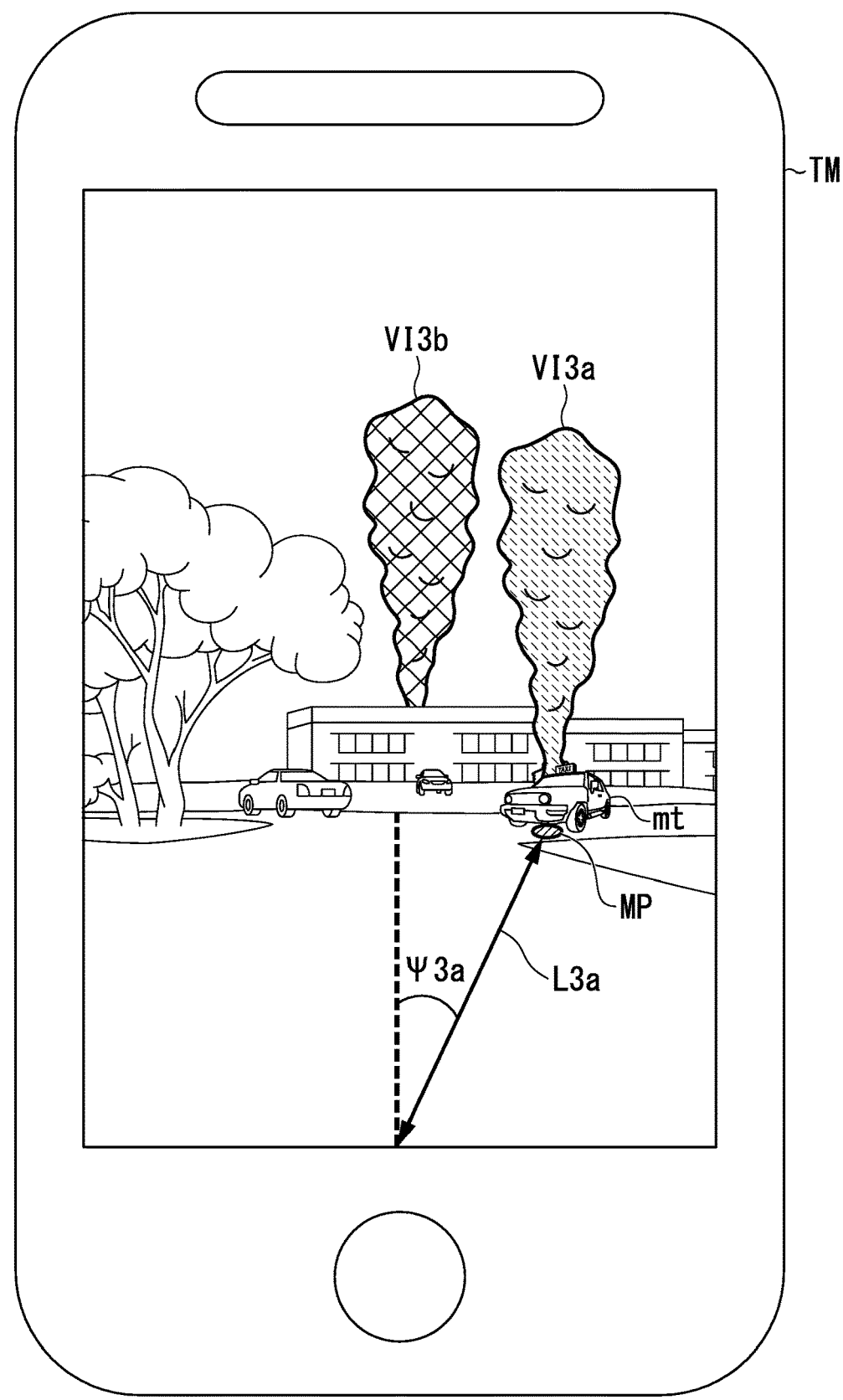
FIG. 25 is a diagram illustrating an example of an execution screen of a taxi application.

FIG. 25 is a diagram illustrating an example of the execution screen of the taxi application. In the execution screen of the taxi application, the target vehicle image VI3

(target vehicle images VI3a and VI3b shown in the drawing) appears (is displayed) and is superimposed on the image of the real space captured by the out camera 11. Specifically, in the example shown in FIG. 25, a target vehicle azimuth angle ψ3a for a taxi mt corresponds to the target vehicle azimuth angle ψ3 and a target vehicle distance L3a for the taxi mt corresponds to the target vehicle distance L3. The target vehicle image VI3a is the image VI indicating the target vehicle position MO of the taxi mt present in the vicinity of the user and is the target vehicle image VI3 appearing at the first position of the terminal device TM. Therefore, the user can intuitively ascertain the position or the direction of the taxi.

The output controller 128 may also perform the change of the size according to the above-described destination distance L1 which is performed on the destination image VI1, the representation of the destination image VI1 according to the situation of the real space, the notification of the direction of the destination image VI1, or the like on the target person vehicle image VI3.

[Regarding the Representation of the Target Vehicle Image VI3]

The output controller 128 may represent the target vehicle image VI3 according to an evaluation of a taxi whose position is indicated by the target vehicle position MP. Here, taxis of which car allocations are possible by the taxi application may be ranked in some cases. This rank is, for example, a rank based on a reputation of a driver who drives the taxi, a reputation of a taxi company to which the taxi belongs, or the like. As the rank is high, the reputation of the taxi is good, and as the rank is low, the reputation of the taxi is bad.

For example, according to the execution of the taxi application 206 in the terminal device TM, the communication device 70 receives information indicating the rank of a taxi present in the vicinity of the terminal device TM from each taxi. For example, in a case where the rank of the taxi received by the communication device 70 is high, the output controller 128 causes the target vehicle image VI3a shown in FIG. 25 to appear, and in a case where the rank of the taxi received by the communication device 70 is low, the output controller 128 causes the target vehicle image VI3b shown in FIG. 26 to appear. The target vehicle image VI3a is, for example, a signal fire of a cold color system, and the target vehicle image VI3b is, for example, a signal fire of a warm color system. Therefore, the user can easily ascertain the reputation of the taxi and select a taxi of which the reputation is good.

[Regarding the Recognition Result of the Operation Recognizer 130]

The operation recognizer 130 of the present embodiment recognizes a gesture that the user grips a signal fire of the target vehicle image VI3 on the basis of the image captured by the in camera 51. An operation for requesting the taxi to perform a car allocation at the position of the target vehicle position MP is associated with the gesture in advance. In a case where the recognition result of the operation recognizer 130 indicates "a gesture for gripping the signal fire of the target vehicle image VI3", the output controller 128 requests the corresponding taxi to perform the car allocation. Therefore, the user can easily request the car allocation. In a case where information indicating that the car allocation is approved is received by the communication device 70, the output controller 128 may also change an aspect of the target vehicle image VI3. Specifically, the output controller 128 causes the target vehicle image VI3a of a signal fire of a cold color system to appear for a taxi of which the car allocation is not requested and causes the target vehicle image VI3b to appear by changing to the target vehicle image VI3b of a signal fire of a warm color system for a taxi of which the car allocation is requested.

The operation recognizer 130 of the present embodiment recognizes a gesture for releasing the signal fire of the target vehicle image VI3 by the user on the basis of the image captured by the in camera 51. An operation for canceling the car allocation of the taxi of the position of the target vehicle position MP is associated with the gesture in advance. In a case where the recognition result of the operation recognizer 130 indicates "a gesture for brushing the signal fire of the target vehicle image VI3", the output controller 128 cancels the car allocation with respect to the corresponding taxi. Therefore, the user can easily cancel the car allocation.

[Regarding the Recognition Result by the Recognizer 132]

Here, the user does not continuously view the execution screen of the taxi application after requesting the taxi to perform the car allocation by the gesture described above in some cases. In this case, it is difficult for the user to notice an arrival of the taxi to which the car allocation is requested. In a case where the taxi application is not activated or in a case where the recognition result of the recognizer 132 indicates that the user is not viewing the execution screen of the taxi application, after requesting the taxi to perform the car allocation, the output controller 128 causes the speaker 61 to output information (for example, a notification sound) indicating the arrival of the taxi. Therefore, the occupant can intuitively ascertain the arrival of the taxi although the occupant does not continuously view the taxi application.

The output controller 128 may cause the speaker 61 to output a sound of a message such as "the taxi arrived" instead of the notification sound. Instead of the speaker 61, the output controller 128 may causes an LED light included in the terminal device TM to blink to inform the arrival of the taxi, and may cause a vibrator included in the terminal device TM to vibrate to inform (notify) the arrival of the taxi.

[Regarding Stop of the Image VI]

In a case where the taxi arrives in the vicinity of the user, the output controller 128 controls the display 41 to stop the appearance (display) of the target vehicle image VI3. Here, in a case where the appearance of the target vehicle image VI3 is stopped as soon as the taxi arrives, it is difficult for the user to find the taxi of which the car allocation is requested in some cases. Therefore, the output controller 128 controls the display 41 to stop the appearance of the target vehicle image VI3 after a predetermined time has elapsed since the taxi arrives or the user gets on the corresponding taxi.

In the above description, a case where the output controller 128 changes the aspect of the target vehicle image VI3 on the basis of an operation (the gesture) of the user recognized by the operation recognizer 130 has been described, but the present invention is not limited thereto. The output controller 128 may also change the aspect of the target vehicle image VI3 on the basis of the operation of the user recognized by the touch panel 81 (for example, tap, flick, swipe, or the like).

In the above description, the taxi has been described as an example of the "target vehicle", but the present invention is not limited thereto. For example, the "target vehicle" may be a vehicle used for car sharing or ride sharing.

[Processing Flow]

Figure 26:
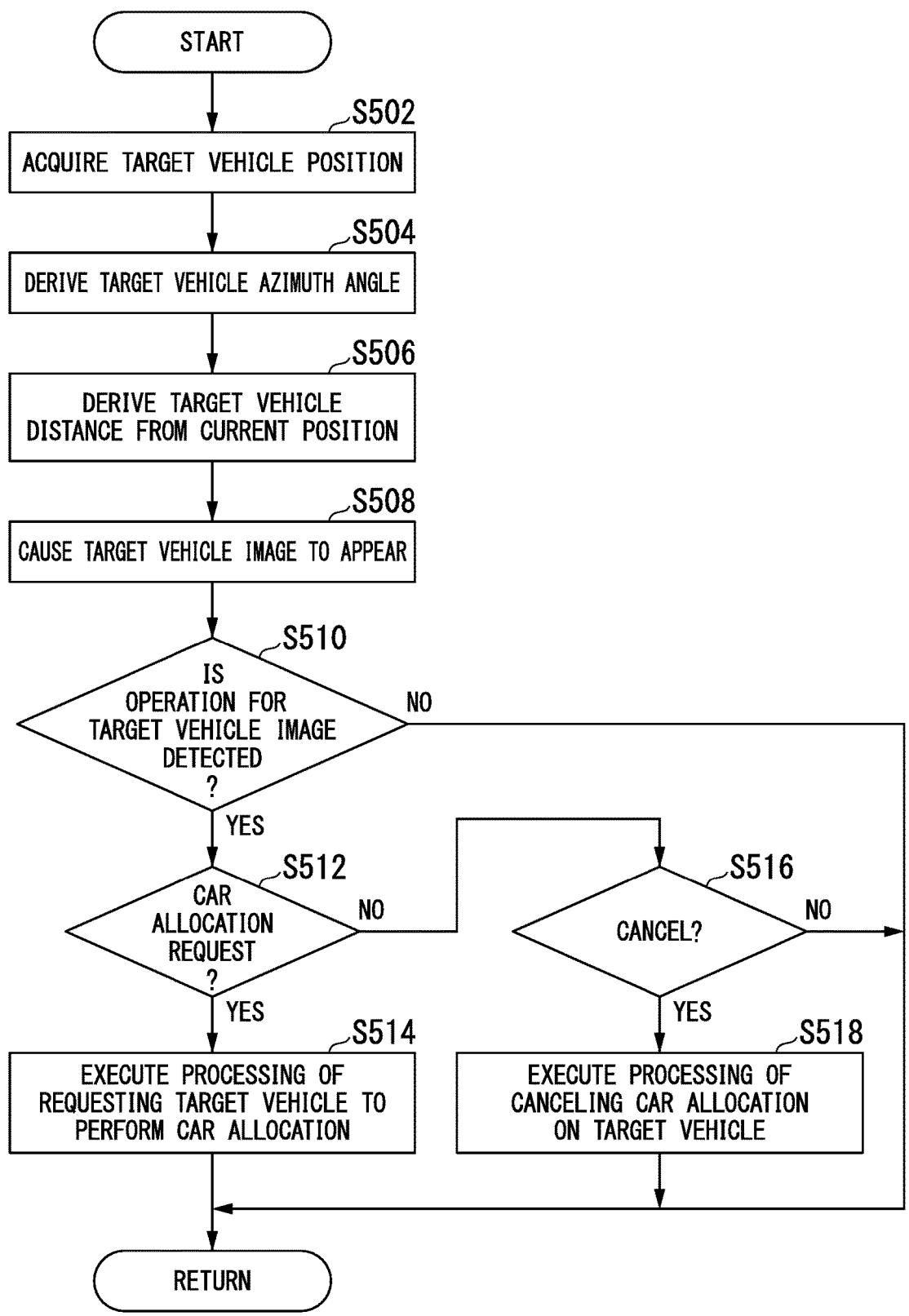
FIG. 26 is a flowchart illustrating an example of processing of an information presentation device 100c of the fourth embodiment.

FIG. 26 is a flowchart illustrating an example of processing of the information presentation device 100c of the fourth embodiment. The flowchart shown in FIG. 26 is repeatedly executed at a predetermined time interval. First, the target position acquirer 122 acquires the target vehicle position MP the taxi present in the vicinity of the terminal device TM (step S502). The direction deriver 124 derives the target vehicle azimuth angle ψ3 on the basis of the first position of the terminal device TM acquired by the first position acquirer 121 and the target vehicle position MP acquired by the target position acquirer 122 (step S504). The distance deriver 126 derives the target vehicle distance L3 on the basis of the first position of the terminal device TM and the target vehicle position MP (step S506). The output controller 128 causes the target vehicle image VI3 to appear (be displayed) on the display 41 on the basis of the derived target vehicle azimuth angle ψ3 and target vehicle distance L3 (step S508).

Next, the output controller 128 determines whether or not the recognition result of the operation recognizer 130 recognizes an operation for the target vehicle image VI3 (step S510). Next, in a case where the recognition result of the operation recognizer 130 indicates that the operation for the target vehicle image VI3 is not recognized, the output controller 128 ends the processing. Next, the output controller 128 determines whether or not the operation for the target vehicle image VI3 indicates the gesture for requesting the car allocation of the taxi (for example, the gesture for gripping the signal fire by a hand) (step S510). Next, in a case where the recognition result of the operation recognizer 130 is the gesture for requesting the car allocation of the taxi, the output controller 128 executes processing of requesting the taxi to perform the car allocation (step S514) and ends the processing.

Next, in a case where the recognition result of the operation recognizer 130 is not the gesture for requesting the car allocation of the taxi, the output controller 128 determines whether or not the recognition result of the operation recognizer 130 indicates the gesture for canceling the car allocation of the taxi (for example, the gesture for brushing the signal fire by a hand) (step S516). Next, in a case where the recognition result of the operation recognizer 130 is not the gesture for canceling the car allocation of the taxi, the output controller 128 ends the processing. Next, in a case where the recognition result of the operation recognizer 130 is the gesture for canceling the car allocation of the taxi, the output controller 128 executes processing of canceling the car allocation of the taxi (step S518) and ends the processing.

[Summary of the Fourth Embodiment]

In the information presentation device 100c of the fourth embodiment described above, the target position is a position of the target vehicle (the taxi in this example) designated by the occupant. The operation recognizer (the in-vehicle camera 50 in this example) that recognizes a content of an operation for the taxi by the occupant and a communication device (the communication device 70 in this example) that communicates with another device are provided. The communication device 70 transmits information indicating the content of the operation to another device (for example, a taxi). Therefore, the information presentation device 100c of the fourth embodiment can enable the occupant to request the taxi to perform the car allocation or cancel the car allocation.

In the information presentation device 100c of the fourth embodiment, the output controller 128 can determine the aspect of the target vehicle image VI3 and provide the target vehicle image VI3 in which it is easy to identify the taxi to the occupant on the basis of the recognition result (presence or absence of the car allocation in this example) of the in-vehicle camera 50.

[Other Examples of the Image VI]

A case where the image VI is the signal fire has been described, but the present invention is not limited thereto. The image VI may be an object other than the signal fire as long as the object extends in the vertical direction from the destination DP, the target person position RP, or the ground of the target vehicle position MP. For example, the superimposed image 202 may be an image indicating a column of light or an image indicating a tower. In this case, the image VI is an image of the column of the light and is an image of the tower. The color of the signal fire in the above-described example is an example and is not limited thereto.

The embodiments described above may be expressed as follows.

A vehicle control device including:
a storage configured to store a program;
a storage device configured to store information; and
a hardware processor configured to execute a program stored in the storage device,
wherein the hardware processor execute the program to:
acquire a first position;
configure to cause an image superimposed on scenery of a real space to appear;
acquire a target position on the real space;
derive a direction from the first position acquirer to the target position; and
control the image appear at the position based on the direction.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information presentation device comprising:
an image generator configured to cause an image superimposed on scenery of a real space to appear;
a storage storing a program; and
a hardware processor configured to execute the program stored in the storage to:
acquire a device position, the device position being a position of the information presentation device,
acquire a target position on the real space;
derive a direction from the device position to the target position; and
control the image generator to cause the image to appear at a position based on the direction,
wherein the hardware processor executes the program to recognize a movement of a wind in the real space, and move the image according to the movement of the wind.

2. The information presentation device of claim 1, wherein the hardware processor executes the program to derive a distance between the target position and the device position, and enlarge the image as the distance becomes smaller.

3. The information presentation device of claim 2,
wherein the hardware processor executes the program to
fix a size of the image to a predetermined size in a case
where the distance is equal to or longer than a predetermined distance.

4. The information presentation device of claim 1,
wherein the image generator causes an image extending in a vertical direction from the ground to appear.

5. The information presentation device of claim 1,
wherein the hardware processor executes the program to cause an image that shields scenery behind the target position from the device position and causes an image that does not shield scenery in front of the target position from the device position to appear.

6. The information presentation device of claim 1,
wherein the hardware processor executes the program to detect a line of sight of a user; and cause at least one of a speaker and the image generator to output information indicating the direction to the target position to the user in a case where the detected line of sight of the user indicates that the user is not viewing the image.

7. The information presentation device of claim 1,
wherein the target position is a position of a target person designated by a user.

8. The information presentation device of claim 7,
wherein the hardware processor executes the program to determine an aspect of the image according to a state of the target person, the state includes at least one of a physical condition, sleeping, waking up, emotion, being at home or absence of the target person.

9. The information presentation device of claim 7,
wherein the hardware processor executes the program to perform an operation for contacting the target person, in a case that the hardware processor recognized a gesture that the user grips the image.

10. The information presentation device of claim 1,
wherein the target position is a position of a target vehicle designated by a user.

11. The information presentation device of claim 10, comprising:
a communication device configured to communicate with the target vehicle,
wherein the target vehicle is a taxi, and
the hardware processor executes the program to recognize a content of an operation for the image of the target vehicle by the user, and perform an allocation of a taxi according to the operation.

12. The information presentation device of claim 11,
wherein the hardware processor executes the program to determine an aspect of the image on the basis of the recognized content of the operation for the target vehicle by the user.

13. An information presentation device comprising:
an image generator configured to cause an image superimposed on scenery of a real space to appear;
a storage storing a program; and
a hardware processor configured to execute the program stored in the storage to:
acquire a device position, the device position being a position of the information presentation device,
acquire a target position on the real space;
derive a direction from the device position to the target position; and
control the image generator to cause the image to appear at a position based on the direction,
wherein the target position is a destination of a user set in a navigation system, and
the hardware processor executes the program to communicate with a vehicle to acquire a destination of the vehicle, and control the image generator to generate other image to appear at the position of the destination of the vehicle in a different color from the image based on the destination of the user.

* * * * *